United States Patent [19]

Hefner, Jr. et al.

[11] Patent Number: 5,066,750

[45] Date of Patent: Nov. 19, 1991

[54] VINYL ESTER RESINS CONTAINING MESOGENIC/RIGID RODLIKE MOIETIES

[75] Inventors: Robert E. Hefner, Jr.; Paul M. Puckett; Jimmy D. Earls, all of Lake Jackson, Tex.

[73] Assignee: The Dow Chemical Company, Midland, Mich.

[21] Appl. No.: 532,544

[22] Filed: Jun. 4, 1990

Related U.S. Application Data

[62] Division of Ser. No. 298,460, Jan. 17, 1989.

[51] Int. Cl.$^5$ .................... C08F 24/00; C08F 124/00; C08F 224/00; C08F 8/00
[52] U.S. Cl. ................... 526/273; 252/299.01; 525/107; 525/108; 525/463; 526/311; 528/112
[58] Field of Search ............... 526/311, 273; 528/112; 252/299.01; 525/107, 108, 463

[56] References Cited

U.S. PATENT DOCUMENTS

| | | | |
|---|---|---|---|
| 3,892,819 | 7/1975 | Najvar | 260/836 |
| 4,798,849 | 1/1989 | Thomas | 521/114 |
| 4,855,376 | 8/1989 | DeMartino | 526/311 |
| 4,869,847 | 9/1989 | Leslie | 252/299.01 |

Primary Examiner—Joseph L. Schofer
Assistant Examiner—Fred Zitomer

[57] ABSTRACT

Thermosettable vinyl ester resin compositions are prepared from polyepoxide compounds, optionally monoepoxide compounds, at least one of which contains a mesogenic or rigid rodlike moiety and a monounsaturated monocarboxylic acid. These vinyl ester resins can be mixed with polymerizable ethylenically unsaturated monomers which can, if desired, contain a mesogenic or rigid rodlike moiety.

8 Claims, No Drawings

VINYL ESTER RESINS CONTAINING MESOGENIC/RIGID RODLIKE MOIETIES

CROSS-REFERENCE TO RELATED APPLICATION

This application is a division of application Ser. No. 07/298,460 filed Jan. 17, 1989, now allowed.

FIELD OF THE INVENTION

The present invention provides vinyl esters containing a mesogenic or rigid rodlike moiety, polymerizable mixtures thereof with one or more ethylenically unsaturated monomers and cured compositions prepared from either the vinyl ester or the vinyl ester and polymerizable monomer mixtures.

BACKGROUND OF THE INVENTION

A wide variety of mesogenic or rigid rodlike containing monomers and the various polymerization products thereof are well known. Representative of these monomers are those taught by Conciatori, et. al. in U.S. Pat. No. 4,514,553 where hydroxyaromatic carboxylic acids are first esterified with an acrylic acid chloride, the resulting acrylic terminated aromatic carboxylic acid is converted to the corresponding carboxylic acid chloride, then coupling with a diphenol provides an acrylate terminated monomer. Although the monomers resulting from this process are reported to be anisotropic, all are solids, with melting points ranging from 60° C. to 154° C., and are therefore not readily processable as curable liquids.

Vinyl esters are the reaction product of about equivalent amounts of a monounsaturated monocarboxylic acid and a polyepoxide. One class of vinyl esters is described by Bearden in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic or methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete, et. al. Fekete, et. al. describe vinyl esters where the molecular weight of the polyepoxide is increased by reacting a dicarboxylic acid with the polyepoxide resin as well as acrylic acid, etc. in U.S. Pat. No. 3,256,226. Polymer modified vinyl esters are described by Najvar in U.S. Pat. No. 3,892,819 where carboxylic acid terminated rubber replaces part of the methacrylic acid reacted with polyepoxide resins. Other functional compounds containing a group reactive with an epoxide group, such as an amine, mercaptan and the like, may be utilized in place of the dicarboxylic acid. All of the above described compositions, which contain the characteristic linkage

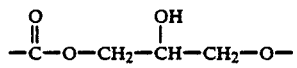

and terminal vinyl or vinylidene groups are classified as vinyl esters. The vinyl esters thus prepared are typically combined with a reactive diluent, a copolymerizable vinyl monomer, to alter the viscosity of the mixture, to vary properties of the cured resin, or for other known reasons. Both the vinyl ester and the vinyl ester resin, i.e. the blend with a copolymerizable vinyl monomer, are curable (thermosettable), typically, by mixing in a free radical forming catalyst and applying heat and/or adding an accelerator.

The vinyl ester resins of the present invention contain one or more mesogenic or rigid rodlike side chain moieties which impart substantial mechanical property enhancement to the cured compositions thereof. Additional compositions of the present invention simultaneously contain both side chain and main chain mesogenic or rigid rodlike moieties. Further compositions of the present invention contain only a main chain mesogenic or rigid rodlike moiety. The presence of the mesogenic or rigid rodlike moiety manifests itself through enhanced mechanical strength, notably tensile and flexural strength/modulus, in the cured products. The invention consists of the vinyl esters and the vinyl ester and polymerizable ethylenically unsaturated monomer formulations, whether or not cured.

SUMMARY OF THE INVENTION

One aspect of the present invention pertains to thermosettable vinyl ester compositions containing a mesogenic or rigid rodlike moiety which are prepared by reacting (A) one or more polyepoxide compounds at least one of which contains a mesogenic or rigid rodlike moiety selected from any such polyepoxides other than the diglycidyl ether of 4,4'-dihydroxybiphenyl or 4,4'-dihydroxychalcone; with (B) one or more polymerizable monounsaturated monocarboxylic acids.

In the above thermosettable vinyl ester compositions, it is optional as to whether or not the polymerizable monounsaturated monocarboxylic acid(s) contain a mesogenic or rigid rodlike moiety. However, preferably from about 1 to about 100, more preferably from about 25 to about 100, most preferably from about 50 to about 100 percent of the epoxide groups are derived from one or more polyepoxides containing a mesogenic or rigid rodlike moiety. Said mesogenic or rigid rodlike moiety can be present only as a side chain, only as a main chain or both as a side chain and main chain component.

Another aspect of the present invention pertains to thermosettable vinyl ester compositions containing a mesogenic or rigid rodlike moiety which are prepared by reacting (A) a polyepoxide composition comprising
  (1) one or more advanced epoxy resins prepared by reacting
    (a) one or more epoxy resins containing an average of more than one vicinal epoxide group per molecule wherein from about zero to 100 percent of such epoxy resins contain a mesogenic or rigid rodlike moiety; with
    (b) at least one compound having an average of more than one phenolic hydroxyl group per molecule or an average of more than one carboxylic acid group per molecule or a combination thereof; and wherein at least one of components (a) or (b) contains a mesogenic or rigid rodlike moiety;

(2) optionally one or more compounds containing only one vicinal epoxide group per molecule wherein from zero to 100 percent of such monoepoxide compounds contain a mesogenic or rigid rodlike moiety; and (3) optionally one or more epoxy resins containing an average of more than one vicinal epoxy group per molecule and which do not contain a mesogenic or rigid rodlike moiety; with (B) one or more polymerizable monounsaturated monocarboxylic acids.

In the above mentioned vinyl ester composition, components (a) and (b) are employed in quantities which provide a ratio of phenolic hydroxyl groups or carboxylic acid groups or a combination of such groups per epoxy group of from about 0.01:1 to about 0.90:1, preferably from about 0.05:1 to about 0.60:1, more preferably from about 0.05:1 to about 0.30:1; from about 1 to about 100, preferably from about 5 to about 95, more preferably from about 25 to about 75 percent of the molecules of components (1) and (2) contain mesogenic or rigid rodlike moieties; component (2) is present in an amount of from about zero to about 95, preferably from about zero to about 60, more preferably from about zero to about 45, percent by weight of the combined weight of components (1), (2) and (3); and component (3) is present in an amount of from about zero to about 90, preferably from about zero to about 60, more preferably from about zero to about 25, percent by weight of the combined weight of components (1), (2) and (3).

Also in the above thermosettable vinyl ester compositions, it is optional as to whether or not the monoepoxide compound(s) and/or the polymerizable monounsaturated monocarboxylic acid(s) contain a mesogenic or rigid rodlike moiety. However, preferably from about 1 to about 100, more preferably from about 20 to about 80, most preferably from about 40 to about 70 percent of the epoxide groups are derived from advanced epoxy resins containing a mesogenic or rigid rodlike moiety. Said mesogenic or rigid rodlike moiety can be present only as a side chain, only as a main chain or both as a side chain and main chain component.

Another aspect of the present invention pertains to thermosettable vinyl ester compositions containing a mesogenic or rigid rodlike moiety which are prepared by reacting (A) a mixture of
 (1) one or more polyepoxide compounds; and
 (2) one or more monoepoxide compounds; wherein at least one of components (1) or (2) contains a mesogenic or rigid rodlike moiety; with (B) one or more polymerizable monounsaturated monocarboxylic acids.

In the above thermosettable vinyl ester compositions, it is optional as to whether or not the polyepoxide compound(s) and/or the polymerizable monounsaturated monocarboxylic acid(s) contain a mesogenic or rigid rodlike moiety. However, preferably from about 1 to about 100, more preferably from about 50 to about 100, most preferably from about 90 to about 100 percent of the molecules of the monoepoxide compound(s) contain a mesogenic or rigid rodlike moiety.

Another aspect of the present invention pertains to a polymerizable mixture of one or more of the aforesaid thermosettable vinyl ester compositions containing a mesogenic or rigid rodlike moiety and one or more ethylenically unsaturated monomers.

A further aspect of the present invention pertains to a thermosettable mixture comprising (A) a thermosettable vinyl ester resin prepared by reacting
 (1) one or more polyepoxide compounds; with
 (2) one or more polymerizable monounsaturated monocarboxylic acids; and blending said reaction product with (B) one or more polymerizable ethylenically unsaturated monomers, at least one of such polymerizable ethylenically unsaturated monomers contains a mesogenic or rigid rodlike moiety.

In the above polymerizable mixture, it is optional as to whether or not the polyepoxide compound(s) and/or the polymerizable monounsaturated monocarboxylic acid(s) contain a mesogenic or rigid rodlike moiety. However, preferably from about 1 to about 100, more preferably from about 1 to about 50, most preferably from about 5 to about 25 percent of the molecules of the polymerizable ethylenically unsaturated monomer(s) contain a mesogenic or rigid rodlike moiety.

Still another aspect of the present invention pertains to polymers and/or thermoset products of one or more of the aforementioned vinyl ester or vinyl ester and polymerizable ethylenically unsaturated monomer compositions.

DETAILED DESCRIPTION OF THE INVENTION

In any of the aforementioned compositions, only one component is required to contain a mesogenic or rigid rodlike moiety; however, any of the other components, if desired, can also contain a mesogenic or rigid rodlike moiety.

Suitable polyepoxides which can be employed herein include those materials having an average of more than one vicinal epoxide group per molecule, such as, for example, the glycidyl ethers represented by the formulas

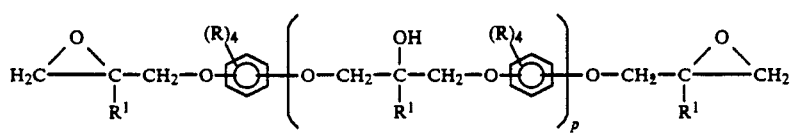

I.

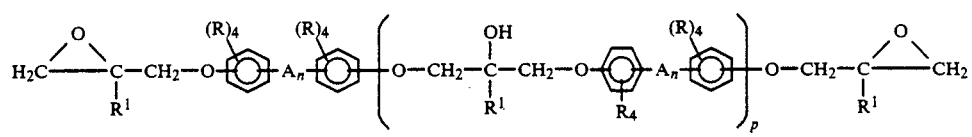

II.

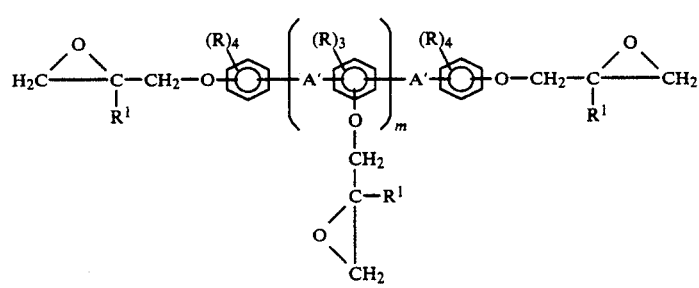

III.

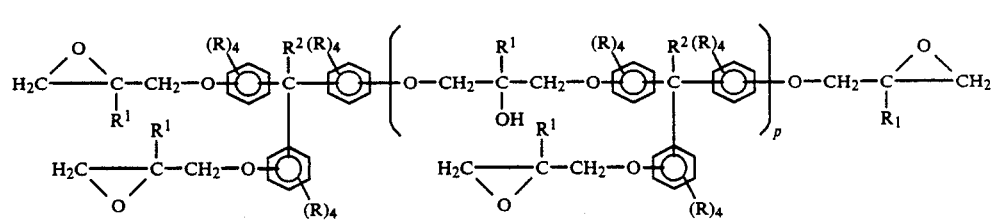

IV.

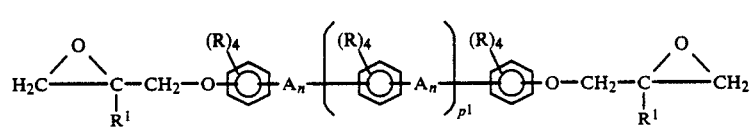

V.

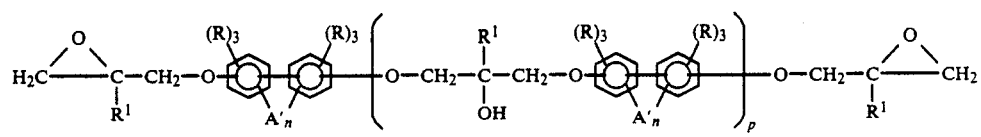

Formula VI.

wherein each A is independently a divalent hydrocarbyl group having from 1 to about 20, preferably from 1 to about 14, carbon atoms, —O—, —CO—, —SO—, —SO$_2$—, —S—, —S—S—, —CR$^1$=CR$^1$—, —C≡C—, —N=N—, —CR$^1$=N—, —O—CO—, —NR$^1$—CO—, —CR$^1$=N—N=CR$^1$—, —CR$^1$=CR$^1$—CO—, —N=CR$^1$—, —CO—O—, —CO—NR$^1$—, —CO—CR$^1$=CR$^1$—, —CO—O—N=CR$^1$—, —CR$^1$=N—O—OC—, —CO—NR$^1$—NR$^1$—OC—, —CH=CH—O—OC—, —CO—O—CH=CH—, —O—OC—CH=CH—, —CH=CH—CO—O—, —CHR$^1$—O—CO—CH=CH—, —CH=CH—CO—O—CHR$^1$—, —CHR$^1$—CO—O—CH—, —CH=CH—O—CO—CHR$^1$—, —CO—S—, —S—OC—, —CH$_2$—CH$_2$—CO—O—, —O—O—C—CH$_2$—CH$_2$—, —C≡C—C≡C—, —CR$^1$=CR$^1$—CR$^1$=CR$^1$—,

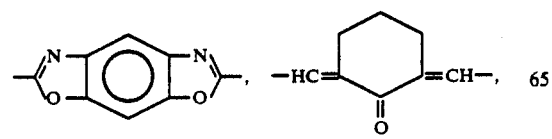

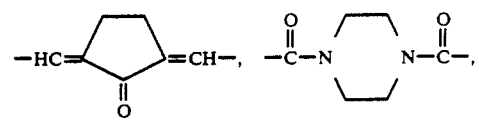

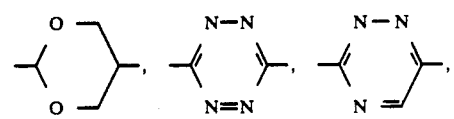

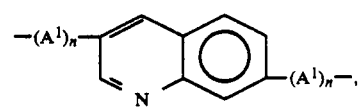

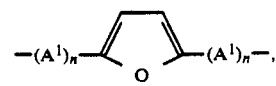

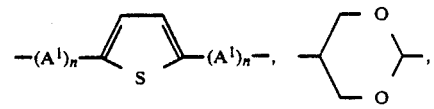

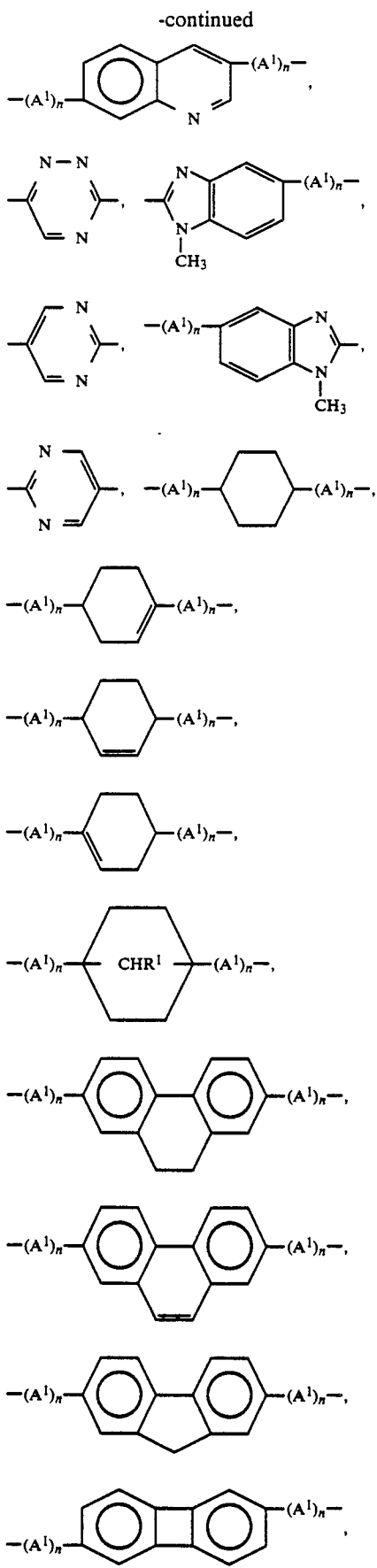

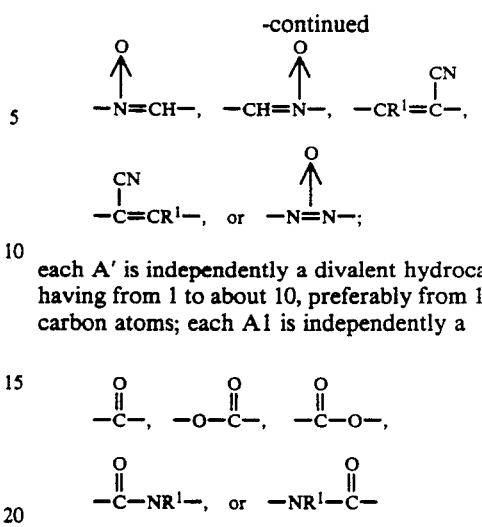

each A' is independently a divalent hydrocarbyl group having from 1 to about 10, preferably from 1 to about 4, carbon atoms; each A1 is independently a $$-\overset{O}{\underset{\|}{C}}-,\quad -O-\overset{O}{\underset{\|}{C}}-,\quad -\overset{O}{\underset{\|}{C}}-O-,$$

$$-\overset{O}{\underset{\|}{C}}-NR^1-,\quad \text{or}\quad -NR^1-\overset{O}{\underset{\|}{C}}-$$

each R is independently hydrogen or a hydrocarbyl or hydrocarbyloxy group having from 1 to about 10, preferably 1 to about 4, carbon atoms, a halogen atom, preferably chlorine or bromine, a nitro group, a nitrile group, a phenyl group or a $-CO-R^1$ group; each $R^1$ is independently hydrogen or a hydrocarbyl group having 1 to about 3 carbon atoms; each $R^2$ is independently hydrogen or a hydrocarbyl group having from 1 to about 10, preferably from 1 to about 3, carbon atoms, a halogen atom, preferably chlorine or bromine; m has a value from about 0.001 to about 6, preferably from about 0.01 to about 3; n has a value of zero or one; p has a value from zero to about 30, preferably from zero to about 5; and $p^1$ has a value from 1 to about 30, preferably from 1 to about 3. The aromatic rings can also contain one or more heteroatoms selected from N, O, S and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A group of Formulas II and V or the A' group of Formula VI, the hydrocarbyl group can also contain one or more heteroatoms selected from N, O, S and the like. Likewise, the term hydrocarbyloxy means a hydrocarbyl group having an oxygen linkage between it and the carbon atom to which it is attached.

Representative of the polyepoxide compounds which are free of mesogenic or rigid rodlike moieties include, for example, the diglycidyl ethers of resorcinol, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A; the triglycidyl ether of tris(hydroxyphenyl)methane; the polyglycidyl ether of a phenol or substituted phenol-aldehyde condensation product (novolac); the polyglycidyl ether of a dicyclopentadiene or an oligomer thereof and phenol condensation product; the advancement reaction products of the aforesaid di- and polyglycidyl ethers with aromatic di- or polyhydroxyl- or carboxylic acid-containing compounds including, for example, bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'- dihydroxyphenyl)methane, 4,4'-dihydroxydiphenyl ether, 3,3',5,5'-tetramethyldihydroxydiphenyl ether, 3,3',5,5'-dichlorodihydroxydiphenyl ether, 4,4'-bis(p-hydroxyphenyl isopropyl)diphenyl ether, 4,4'-bis(p-hydroxyphenoxy)benzene, 4,4'-bis(p-hydroxyphenoxy)diphenyl ether, 4,4'-bis(4(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol; mixtures thereof and the like.

The polyepoxides containing a mesogenic or rigid rodlike moiety which can be employed herein include, for example, those represented by the aforementioned formulas II or VI wherein at least 80 percent of the molecules are para substituted by both the bridging groups (-A-) and the glycidyl ether linkages

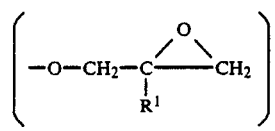

as well as hydroxyether linkages

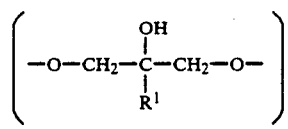

which are present when p has a value greater than zero and by formula V wherein at least 80 percent of the molecules are para substituted by both the bridging groups (-A-) and the glycidyl ether linkages

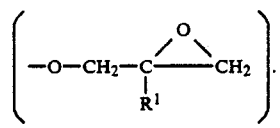

For Formula VI, it is to be understood that para substitution is with respect to the direct bond between the aromatic rings. The bridging groups (-A-) form a rigid central linkage between the aromatic ring pairs, that is, A is a direct single bond, —C≡C—, —CR¹=N—, —N=N—, —O—CO—, —NR¹—CO—, —CR¹=N—N=CR¹—, —CR¹=CR¹—CO—, —CR¹=CR¹—, —N=CR¹—, —CO—O—, —CO—NR¹—, —CO—CR¹=CR¹—, —CO—O—N=CR¹—, —CR¹=N—O—OC—, —CO—NR¹—NR¹—OC—, —CH=CH—O—OC—, —CO—O—CH=CH—, —O—OC—CH=CH—, —CH=CH—CO—O—, —CHR¹—O—CO—CH=CH—, —CH=CH—CO—O—CHR¹—, —CHR¹—CO—O—CH=CH—, —CH=CH—O—CO—CHR¹—, —CO—S—, —S—OC—, —CH₂—CH₂—CO—O—, —O—OC—CH₂—CH₂—, —C≡C—C≡C—, —CR¹=CR¹—CR¹=CR¹—,

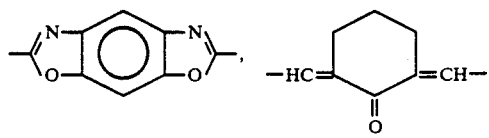

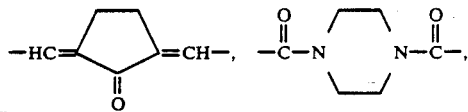

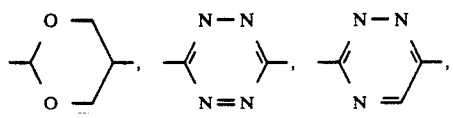

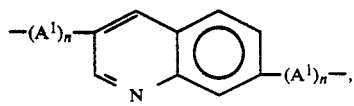

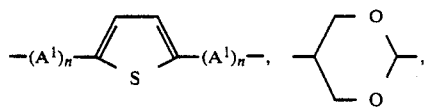

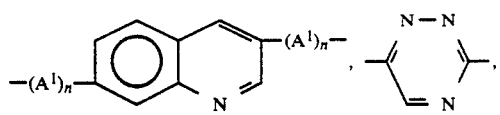

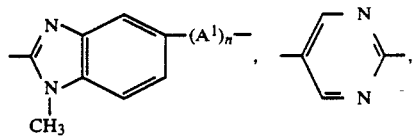

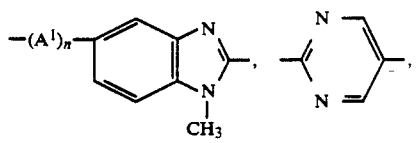

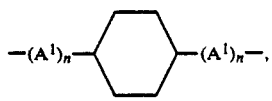

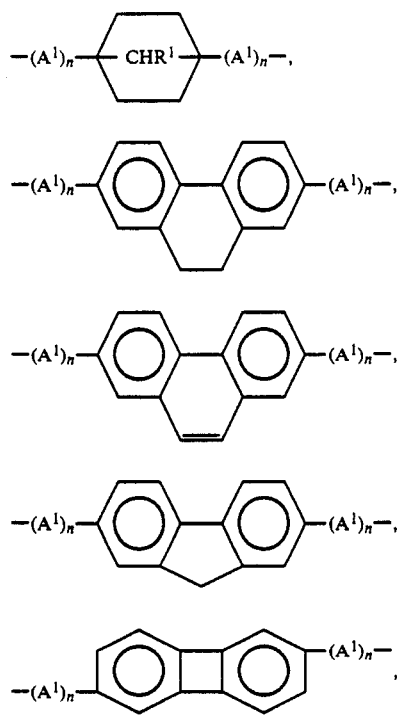

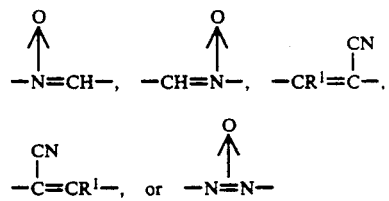

group and n, $A^1$ and $R^1$ are as hereinbefore described. To optimize the aspect ratio of said mesogenic or rigid rodlike functionalities, it is preferred that the aromatic ring substituents (R in Formulas II, V and VI) are hydrogen or methyl groups.

Representative polyepoxide compounds containing a mesogenic or rigid rodlike moiety include, for example, the diglycidyl ethers of 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis((4-hydroxy)phenoxy)diphenyl, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, the diglycidyl ethers of the dihydric phenols represented by the following formulas:

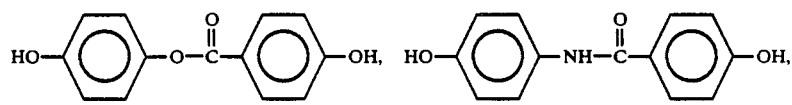

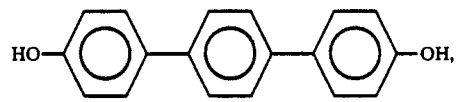

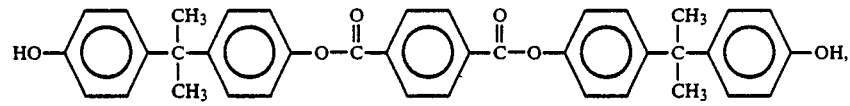

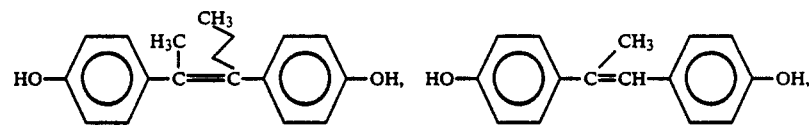

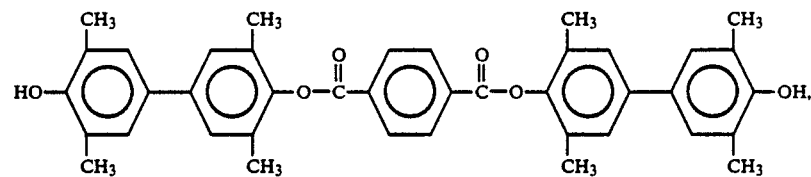

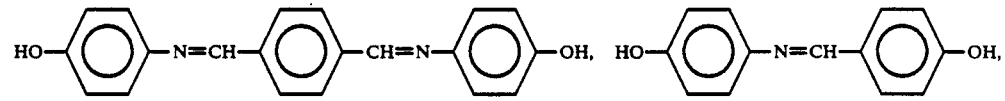

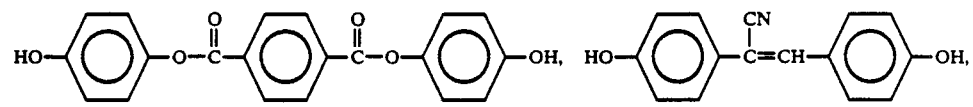

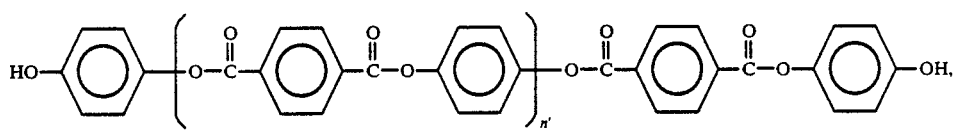

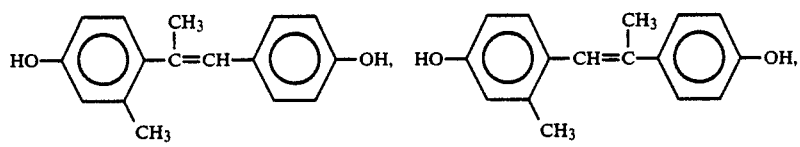

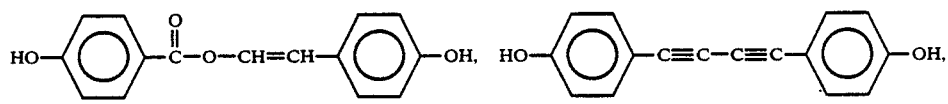

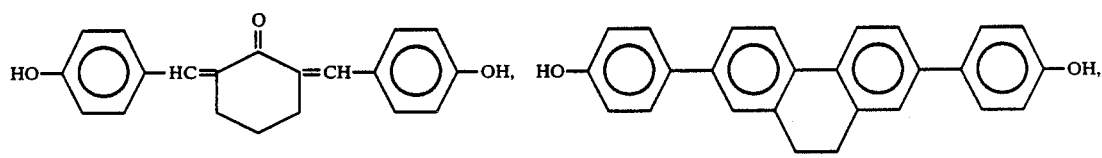

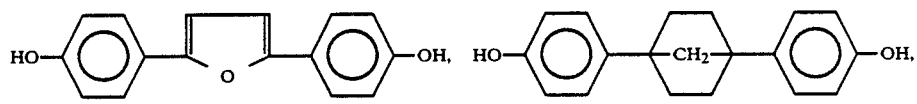

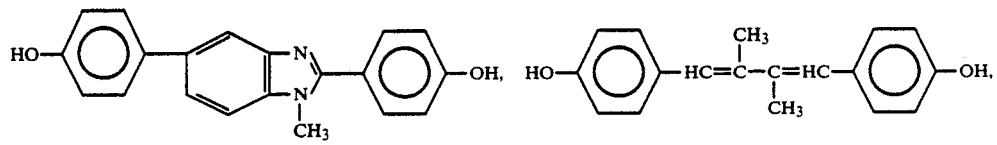

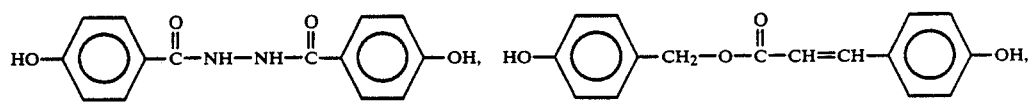

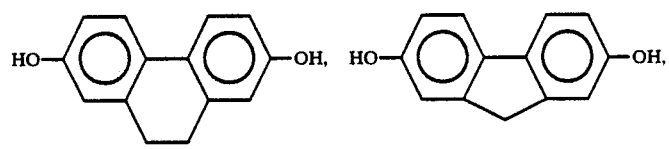

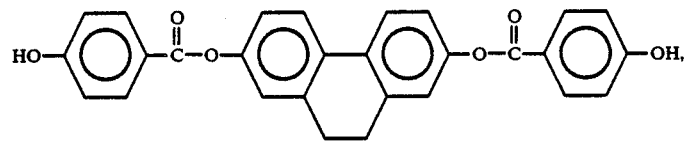

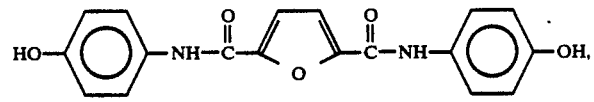

wherein n' has a value from 1 to about 10. Also suitable are the products resulting from advancing the aforementioned diglycidyl ethers with aromatic dihydroxyl or carboxylic acid containing compounds including, for example, all of the previously listed diphenol precursors to the diglycidyl ethers containing a mesogenic or rigid rodlike moiety; mixtures thereof and the like.

Epoxidation of di- and polyhydroxy aromatic compounds (or di- and polycarboxylic acids) can be performed by the known methods described in *Handbook of Epoxy Resins* by Lee and Neville, McGraw-Hill, 1967; Jpn. Kokai Tokkyo Koho JP 62 86,484 (87 96,484); EP 88-008358/92 and *Journal of Applied Polymer Science*, Vol. 23, 1355–1372 (1972) all of which are incorporated herein by reference. This usually includes reacting the respective di- or polyhydroxy aromatic compound (or di- and polycarboxylic acids) with an epihalohydrin such as, for example, epichlorohydrin or methyl epichlorohydrin, followed by dehydrohalogenation with a basic-acting material such as, for example, an alkali metal hydroxide, typically sodium hydroxide, and finally recovering the resulting glycidyl ether product. For the production of polyepoxides from di- and polyhydroxy aromatic compounds possessing functional groups or linkages that are sensitive to hydrolysis under the reaction conditions employed in certain epoxidation chemistries, alternate techniques of preparation may be employed. As a typical example, Japanese Patents 58-206579 (Derwent Abstract 84-014278/03) and 63-010617 ((Derwent Abstract 88-053838/08) teach preparation of the diglycidyl ether of the bisphenol represented by the following formula

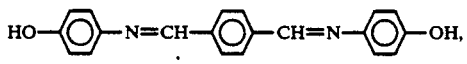

which is a compound containing azomethine linkages known to be sensitive to hydrolysis. Anhydrous epoxidation techniques which employ azeotropic removal of water/epichlorohydrin concurrent with the controlled addition of aqueous sodium hydroxide to a reaction mixture consisting of epichlorohydrin, a diphenol, a phase transfer catalyst such as, for example, benzyltrimethylammonium chloride, and optionally, solvent(s) may also be employed. It is advantageous to conduct such anhydrous epoxidation reactions under a vacuum to facilitate the azeotropic removal of water. It is also operable and advantageous to utilize sodium hydroxide free of water as the alkali metal hydroxide reactant. In order to control reaction exotherm, the solid sodium hydroxide is typically added in aliquots as a powder to the epoxidation reaction mixture. A typical anhydrous epoxidation technique is described in U.S. Pat. No. 4,499,255 which is incorporated herein by reference in its entirety.

Advancement reaction of di- and polyglycidyl ethers with di- and polyhydroxy aromatic compounds (or di- and polycarboxylic acids) can be performed by the known methods described in the aforementioned *Handbook of Epoxy Resins*. This usually includes combining the di- or polyhydroxy aromatic compound (or di- and polycarboxylic acid) and the di- or polyglycidyl ether with the application of heat and mixing to effect the advancement reaction. A catalyst such as, for example, ethyltriphenylphosphonium acetate.acetic acid complex, tetrabutylphosphonium bromide, tetrabutylammonium bromide or benzyltrimethylammonium chloride, is frequently added to facilitate the advancement reaction. Suitable advancement catalysts which can be employed include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 which are incorporated herein by reference. For the production of advanced polyepoxides using di- or polyhydroxy aromatic compounds which are of low solubility in the di- or polyglycidyl ether reactant or which possess relatively high melting points, it is frequently of advantage to add one or more solvents to the advancement reaction mixture. Care should be taken to utilize only those solvents which are inert to reaction with any of the reactants employed in the advancement reaction or the product formed therefrom. Advancement reaction of the di- or polyglycidyl ethers may also be performed using primary monoamines, bis(secondary diamines) or aromatic di- or polythiol compounds.

Suitable aromatic di- or polyhydroxyl containing compounds which can be reacted with the di- or polyepoxides to prepare advanced epoxy resins include, for example, those represented by the aforementioned formulas I, II, III, IV, V or VI wherein the glycidyl ether groups have been replaced with hydroxyl groups. Particularly suitable such di- or polyhydroxyl containing compounds include, for example, resorcinol, catechol, hydroquinone, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 3-phenylbisphenol A, 3,3'5,5'-tetrachlorobisphenol A, 3,3'-dimethoxybisphenol A, 4,4'-dihydroxybiphenyl, 4,4'-dihydroxystilbene, 4,4'-dihydroxydiphenylacetylene, 4,4'-dihydroxybenzanilide, 4,4'-dihydroxy-α-methylstilbene, 4,4'-dihydroxydiphenylazomethine, 4,4'-dihydroxyazobenzene, 4,4'-dihydroxyazoxybenzene, 4,4'-bis((4-hydroxy)phenoxy)diphenyl, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxybiphenyl, 4,4'-dihydroxychalcone, 4,4'-dihydroxy-α-cyanostilbene, 4,4'-dihydroxyphenylbenzoate, any combination thereof and the like.

Suitable di- and polycarboxylic acids which can be employed to prepare advanced epoxy resins include, for example, 1,4-cyclohexane dicarboxylic acid, 4,4'-dicarboxybiphenyl, 4,4'-dicarboxy-α-methylstilbene, 4,4'-dicarboxydiphenylacetylene, 4,4'-dicarboxystilbene, 4,4'-dicarboxydiphenylazomethine, 4,4'-dicarboxydiphenylmethane, 4,4'-dicarboxydiphenyl oxide, 4,4'-dicarboxydiphenyl sulfide, 4,4'-dicarboxydiphenyl sulfone, 1,4-benzenedicarboxylic acid, any combination thereof and the like.

Reaction temperatures of from about 25° C. to about 250° C. are used for the advancement reaction with temperatures of from about 60° C. to about 200° C. being preferred. Reaction times from about 15 minutes to about 24 hours are used for the advancement reaction with times of from about 30 minutes to about 4 hours being preferred.

Suitable monoepoxide compounds containing one or more mesogenic or rigid rodlike moieties which are useful in the preparation of the mesogenic or rigid rodlike containing vinyl ester compositions of the present invention are prepared using conventional chemistry that is well known in the prior art. As a group, these compounds contain an average of about one 1,2-epoxide group per molecule. One class of the requisite monoepoxide compounds are typically prepared by the reaction of a material containing an average of one group reactive with an epoxide group per molecule and one or more mesogenic or rigid rodlike moieties with an epihalohydrin, such as epichlorohydrin, followed by dehydrohalogenation with a basic-acting material, such as an alkali metal hydroxide, followed by recovering the resultant monoglycidyl ether product. For the production of monoepoxides possessing functional groups or linkages that are sensitive to hydrolysis under the reaction conditions employed in certain epoxidation chemistries, alternate techniques of preparation previously described for the polyepoxides can be employed.

Suitable monoepoxide compounds which are free of any mesogenic or rigid rodlike moieties which can be employed herein include, for example, the aliphatic and aromatic monoglycidyl ethers such as, for example, butyl glycidyl ether, phenyl glycidyl ether, cresyl glycidyl ether or any combination thereof and the like.

Suitable compounds containing an average of one group reactive with an epoxide group and one or more mesogenic or rigid rodlike moieties per molecule are represented by the formulas VII or VIII:

M-Q (VII)

M-R'-Q (VIII)

wherein Q is an epoxide reactive group; M is a group containing two or more aromatic rings bridged by a rigid central linkage; R' is a divalent hydrocarbon group having from one to about 12 carbon atoms and may be linear, branched, cyclic, aromatic or a combination thereof and may be substituted with one or more inert groups, such as, for example, a methoxy group, or may contain one or more inert heteroatom containing linkages, such as, for example, an ether linkage. Epoxide reactive groups represented by Q include —OH, —NHR", —SH, —COOH, and the like. Typical rigid central linkage groups for bridging the aromatic rings include, for example, a direct bond, or a —CR¹=CR¹—, —C≡C—, —N=N—, —CR¹=N—, —CR¹=N—N=CR¹—, —CR¹=CR¹—CO—, —O—CO—, —NR¹—CO—, —N=CR¹—, —CO—O—, —CO—NR¹—, —CO—CR¹=CR¹—, —CO—O—N=CR¹—, —CR¹=N—O—OC—, —CO—NR¹—NR¹—OC—, —CH=CH—O—OC—, —CO—O—CH=CH—, —O—OC—CH=CH—, —CH=CH—CO—O—, —CHR¹—O—CO—CH=CH—, —CH=CH—CO—O—CHR¹—, —CHR¹—CO—O—CH=CH—, —CH=CH—O—CO—CHR¹—, —CO—S—, —S—OC—, —CH₂—CH₂—CO—O—, —O—OC—CH₂—CH₂—, —C≡C—C≡C—, —CR¹=CR¹—CR¹=CR¹—,

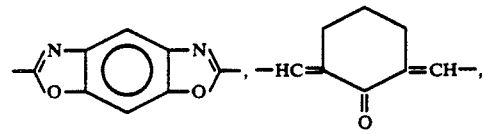

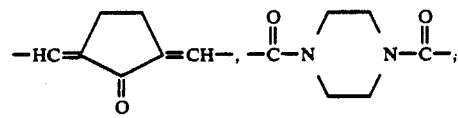

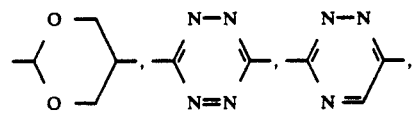

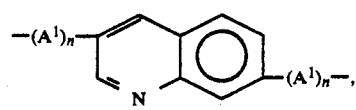

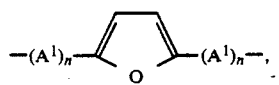

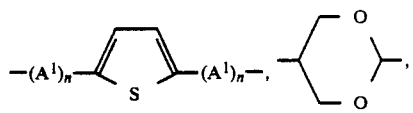

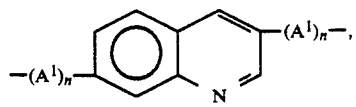

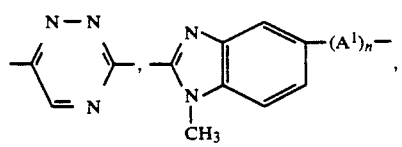

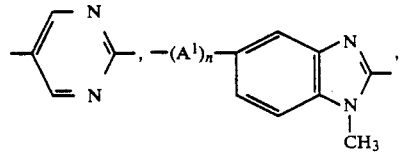

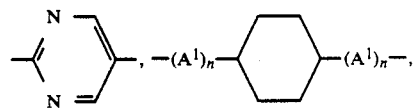

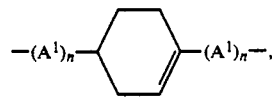

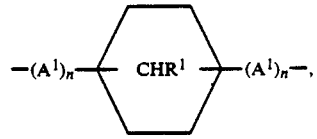

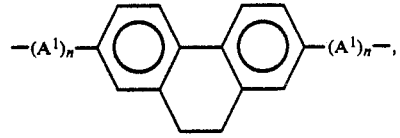

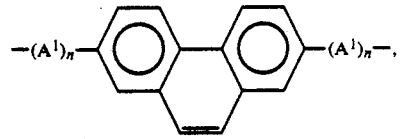

-continued

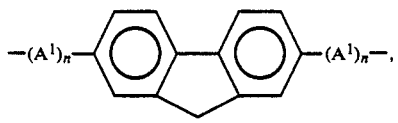

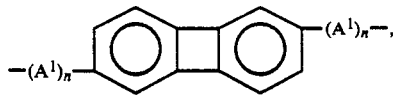

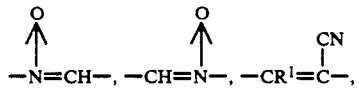

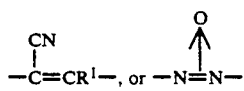

group and the like; wherein each $R^1$ and $A^1$ are as hereinbefore defined and R" is a divalent hydrocarbon group having from about 1 to about 20 carbon atoms and can be linear, branched, cyclic, aromatic or a combination thereof. The rigid central linkage is required to bridge the aromatic rings to provide at least about 80 percent para substitution and must be free of any epoxide reactive moieties under the reaction conditions specified herein. The aromatic rings present in the M group may be inertly substituted, however, unsubstituted aromatic rings are most preferred. The aromatic rings may also contain one or more heteroatoms.

Suitable compounds containing one or more mesogenic or rigid rodlike moieties and a single epoxide reactive group include, for example, p-hydroxydiphenyl; p-N-methylaminodiphenyl; p-hydroxyphenylbenzoate; monomethylether of hydroquinone terephthalate; monomethylether of 4,4'-dihydroxydiphenyl; mono-n-butylether of 4,4'-dihydroxydiphenyl; monomethylether of 4,4'-dihydroxystilbene; 4(4-hydroxybenzoyl)benzoic acid; 4-phenylbenzoic acid; or those compounds represented by the following formulas

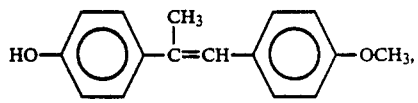

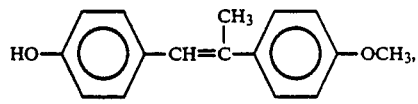

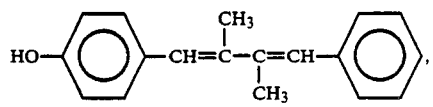

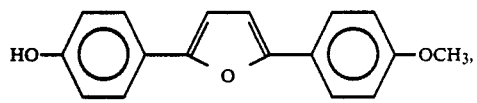

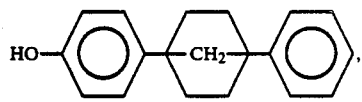

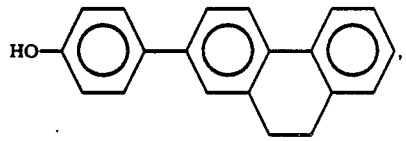

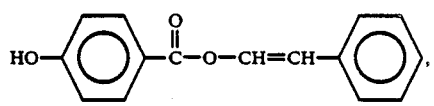

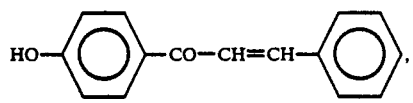

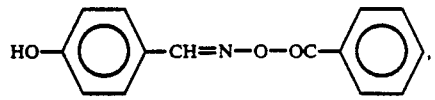

-continued
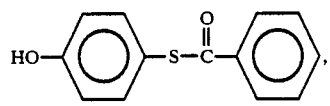
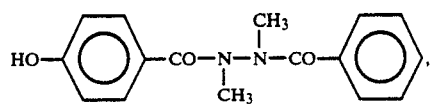
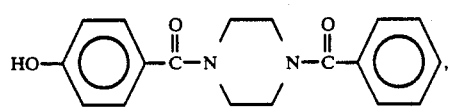
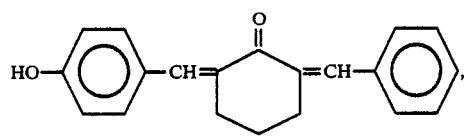
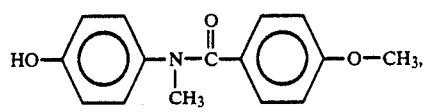
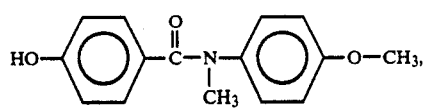
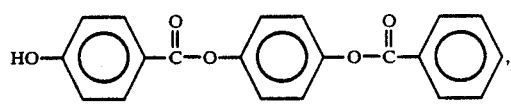
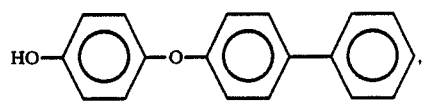
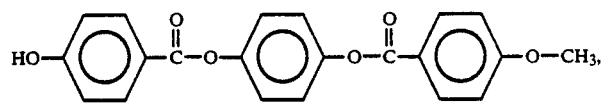
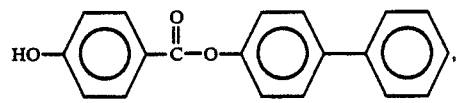
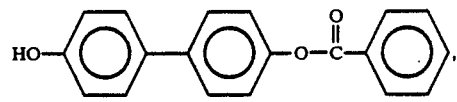
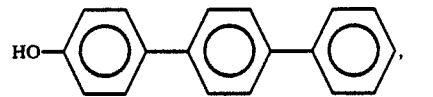
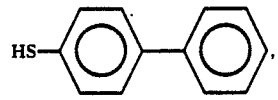

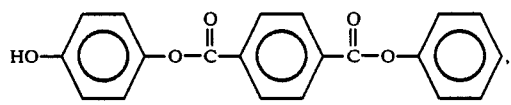
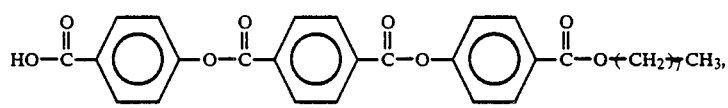
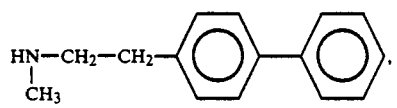
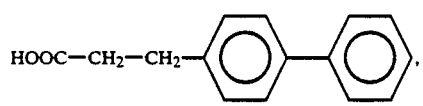
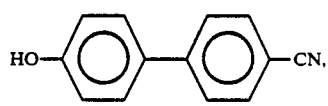
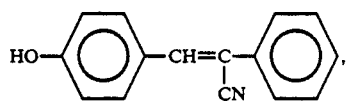
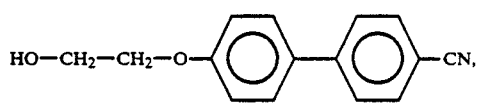
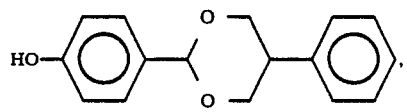
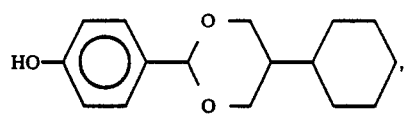
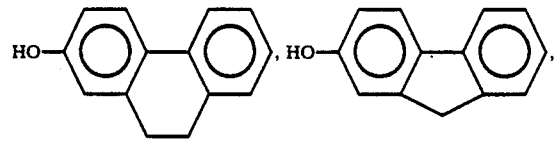
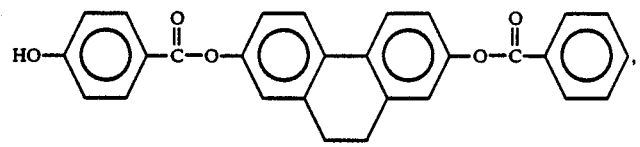
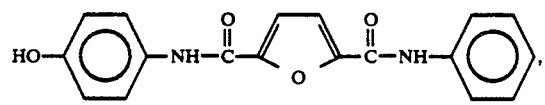
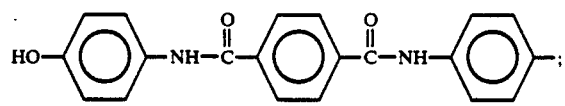
mixtures thereof and the like.

This class of monoepoxide compounds containing mesogenic or rigid rodlike moieties can be represented by the following formulas IX or X

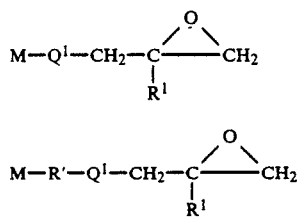

wherein M, $R^1$, R' and R" are as previously defined and $Q^1$ is —O—, —NR"—, —S—, or —CO—O—.

A second class of the monoepoxide compounds containing a mesogenic or rigid rodlike moiety include those which are typically prepared by the epoxidation of a compound containing an average of one epoxidizable olefinic unsaturated group per molecule and one or more mesogenic or rigid rodlike moieties per molecule. Typical methods for preparing these monoepoxide compounds include conversion of the olefin precursor to a chlorohydrin by hypochlorous acid treatment followed by dehydrochlorination of the resultant chlorohydrin intermediate thus formed; treatment of the olefin precursor with one or more organic peracids (Prilezhaev Reaction) or peracid forming compounds such as, for example, perbenzoic acid, m-chloroperbenzoic acid, acetaldehyde monoperacetate, monoperphthalic acid, peracetic acid, performic acid, trifluoroperacetic acid and 3,5-dinitroperoxybenzoic acid; or treatment of the olefin precursor with one or more inorganic peracids such as, for example pertungstic acid. Details concerning these methods are taught by the aforementioned *Handbook of Epoxy Resins*, pages 3-1 to 3-24 (1967) published by McGraw-Hill, Inc.; by D. Swern in *Organic Reactions*, volume 7, pages 378-433 (1953) published by John Wiley and Sons, Inc.; by D. Swern in *Organic Peroxides*, volume 2, pages 355-533 (1971) published by Wiley-Interscience; W. D. Emmons and A. S. Pagano, *Journal of the American Chemical Society* 77, 89-92 (1955) and W. H. Rastetter, T. J. Richard and M. D. Lewis, *Journal of Organic Chemistry* 43, 3163-3169 (1978). Additional methods for preparing these monoepoxide compounds involve reaction of the olefin precursor with oxygen or an alkyl peroxide either directly or in the presence of a catalyst consisting of a complex of vanadium, titanium, cobalt or molybdenum. Details concerning these methods are taught by T. Katsuki and K. B. Sharpless, *Journal of the American Chemical Society* 102, 5974-5976 (1980); B. E. Rossiter, T Katsuki and K. B. Sharpless, ibid. 103, 464-465 (1981); E. D. Mihelich, K. Daniels and D. J. Eickhoff, ibid. 103, 7690-7692 (1981); E. S. Gould, R. R. Hallet and K. C. Irwin, ibid. 90, 4573-4579 (1960); H. J. Ledon, P. Durbut and F. Varescon, ibid. 103, 3601-3603 (1981); L. D.-L. Lu, R. A. Johnson, M. G. Finn and B. K. Sharpless, *Journal of Organic Chemistry* 49, 728-731 (1984) and R. A. Budnik and J. K. Kochi, ibid. 41, 1384-1389 (1976). As will be recognized by the skilled artisan, a wide range of additional olefin epoxidation techniques are available, notably the use of chromyl complexes in direct olefin epoxidation as taught by N. Miyaura and J. K. Kocki, *Journal of the American Chemical Society* 105, 2368-23 (1983); the use of a peroxysulfur intermediate in olefin epoxidation as taught by Y. H. Kim and B. C. Chung, *Journal of Organic Chemistry* 48, 1562-1564 (1983); the use of tungstate plus phosphate (arsenate) ions with hydrogen peroxide to epoxidize olefins as taught by C. Venturello, E. Alneri and M. Ricci, ibid. 48, 3831-3833 (1983); ferric chloride activated hydrogen peroxide in olefin epoxidation as taught by H. Sugimoto and D. T. Sawyer, ibid. 50, 1784-1786 (1985) and olefin epoxidation using sodium hypochlorite and tetraphenylporphrinatomanganese acetate as taught by M. E. DeCarvalho and B. Meunier, *Tetrahedron Letters* 24, 3621-3624 (1983). The aforementioned references are incorporated herein by reference.

Suitable mesogenic or rigid rodlike containing compounds having an average of one epoxidizable olefin group per molecule and one or more mesogenic or rigid rodlike moieties are represented by the formula:

$$M\text{-}(T)_n\text{-}(R')_n\text{-}Q' \qquad (XI)$$

wherein M, $R^1$, R' and R" are as hereinbefore defined; each n independently has a value of zero or one; T is a divalent heteroatom selected from the group consisting of —O—, —NR"—, —S—; and Q' is an epoxidizable monoolefin group. The rigid central linkage groups for bridging the aromatic rings contained in M should be substantially unreactive under the reaction conditions used for the epoxidation. Thus, typical rigid central linkage groups include, for example, a direct bond, —O—CO—, —$NR^1$—CO—, —CO—O—, —CO—$NR^1$—, —O—OC—$CH_2$—$CH_2$—, —$CH_2$—$CH_2$—CO—O—, —CO—$NR^1$—$NR^1$—OC—,

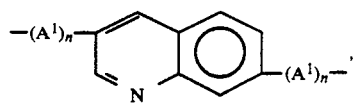

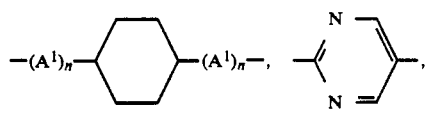

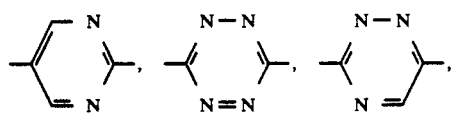

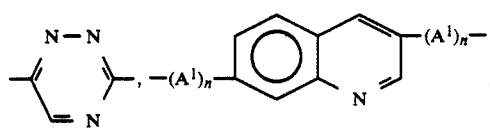

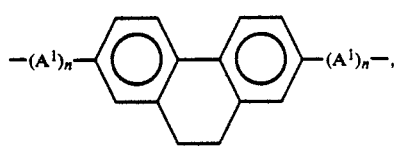

27
-continued

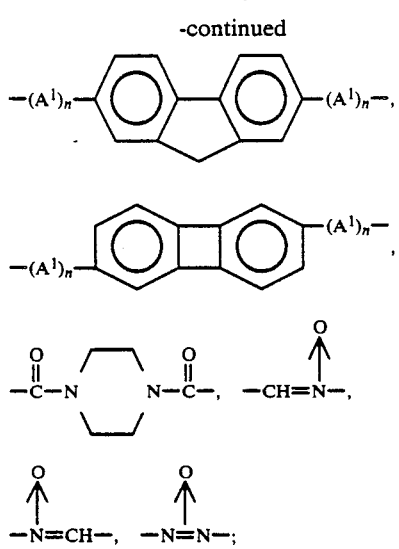

group and the like and n, $A^1$ and $R^1$ are as hereinbefore described.

This class of monoepoxide compounds containing a mesogenic or rigid rodlike moiety can thus be represented by the following formula XII $$M\text{-}(T)_n\text{-}(R')_n\text{-}Q^2 \qquad \text{(XII)}$$

wherein M, R' and T are as defined above and $Q^2$ is the epoxidized olefin group such as, for example,

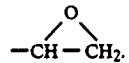

Suitable compounds containing one or more mesogenic or rigid rodlike moieties and an average of one epoxidizable olefinic unsaturated group per molecule include, for example, those represented by the following formulas

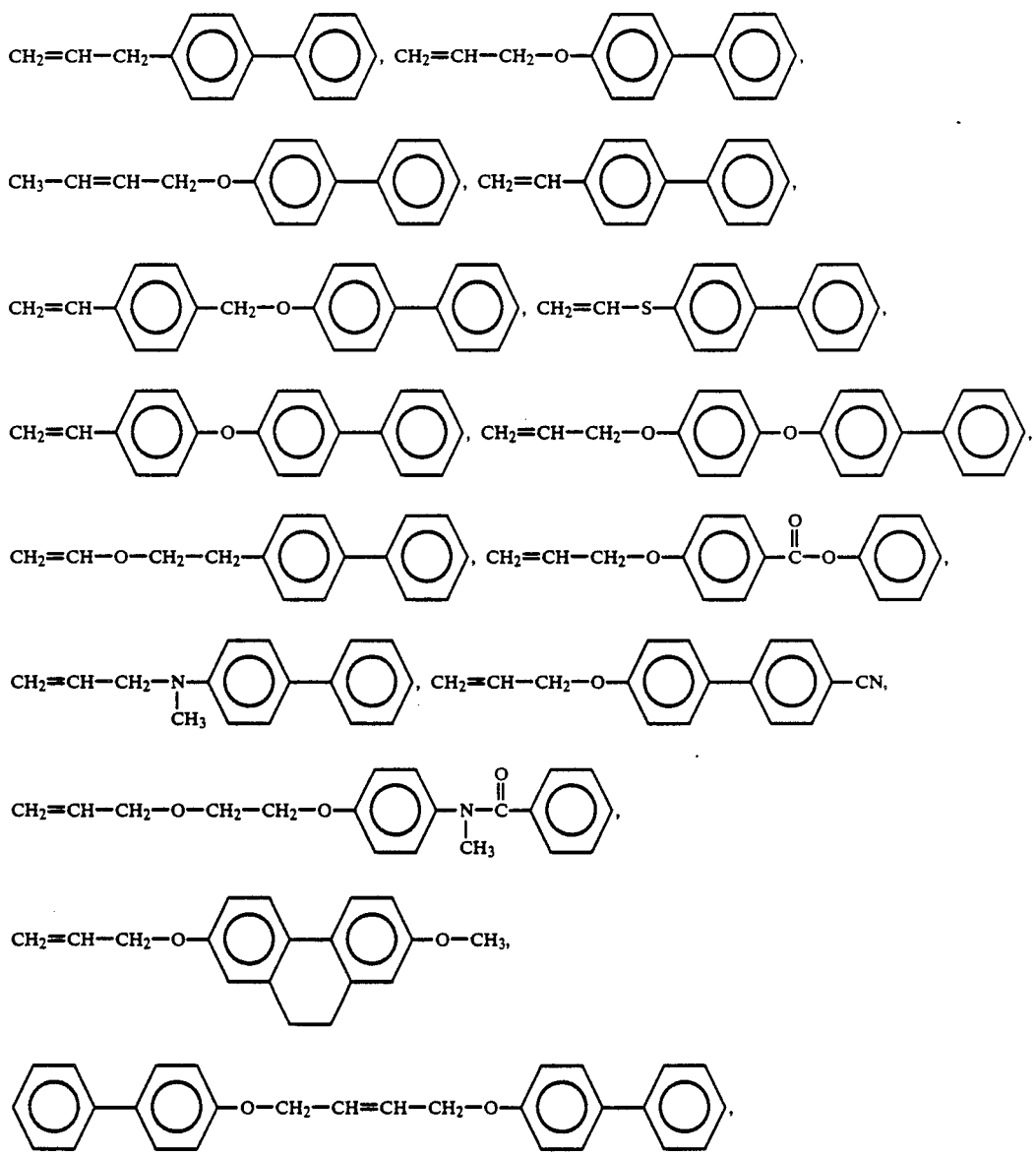

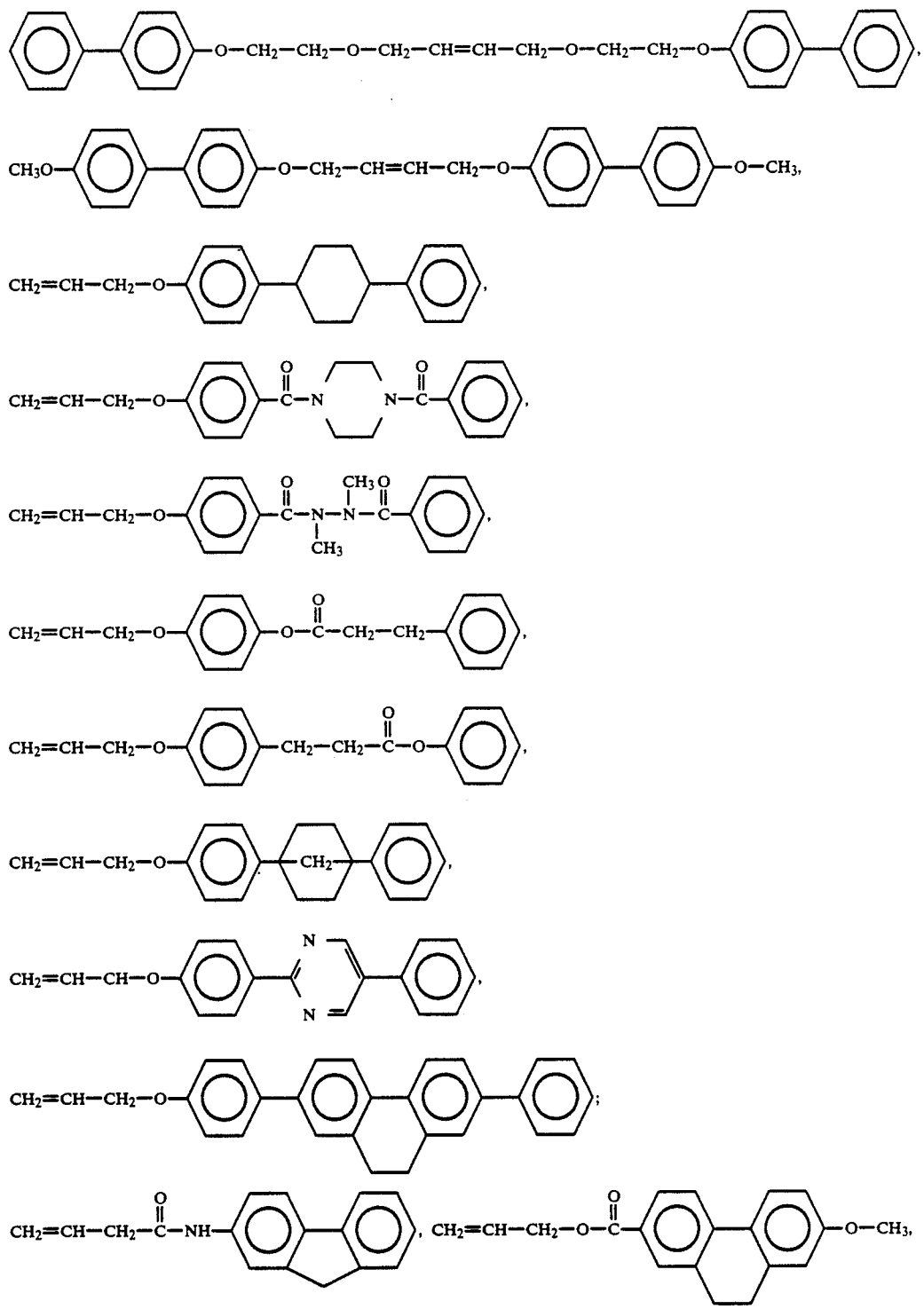

mixtures thereof and the like. Although it is not specifically indicated by the aforementioned monoolefin structural formulas, many of the synthetic methods herein cited can be used to provide optical activity (chirality) in the monoepoxides prepared therefrom. Retention of this optical activity in the products of the present invention is especially desirable as a means of enhancing their molecular order.

Suitable monounsaturated monocarboxylic acids for reaction with monoepoxide and/or polyepoxide compounds include, for example, acrylic acid, methacrylic acid, cyanoacrylic acid, crotonic acid, alpha-phenylacrylic acid, methoxyacrylic acid, alpha-4-phenylphenylacrylic acid, monomethylester of maleic acid, monomethylester of fumaric acid,

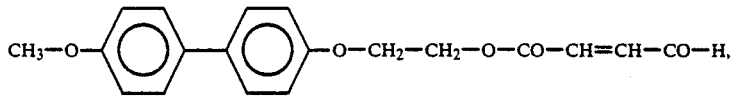

mixtures thereof and the like. Methacrylic acid is a most preferred monounsaturated monocarboxylic acid. A mole ratio of 0.9 to 1.1 monounsaturated monocarboxylic acid per epoxide group is preferred with a ratio of 0.95 to 1.00 being most preferred.

The reaction between the epoxide group and the carboxylic acid group is typically performed in the presence of one or more catalysts. Chromium trichloride and tris(dimethylaminoethyl)phenol are most preferred as the catalysts. A quantity of from about 0.01 to about 2 percent by weight has been found to be a suitable quantity of catalyst with concentrations of 0.1 to about 0.3 weight percent of the total reactants used being most preferred.

A suitable process inhibitor is typically used in the reaction between the epoxide group and the carboxylic acid group to prevent gelation (homopolymerization of the vinyl ester(s) and/or copolymerization of the vinyl ester(s) with unreacted monounsaturated monocarboxylic acid). Hydroquinone activated with air is a most preferred inhibitor at concentrations of from about 100 ppm to about 500 ppm based on the weight of the total reactants used.

The reaction to produce the vinyl ester compositions containing mesogenic or rigid rodlike moieties is optionally conducted in one or more organic solvents inert to the other reactants. The term inert as applied to the organic solvent means that little, if any, reaction between the monoepoxide and/or polyepoxide compounds, the monounsaturated monocarboxylic acid or the vinyl esters thereof occurs under the reaction conditions employed. Typical of the inert organic solvents are the aliphatic ketones, such as methylisobutyl ketone, the chlorinated aliphatics, such as perchloroethylene and the aromatic hydrocarbons, such as toluene.

The reaction to produce vinyl esters is usually conducted at a temperature of from about 50° C. to about 125° C., preferably from about 80° C. to about 120° C. for from about 90 minutes to about 720 minutes, preferably from about 120 minutes to about 420 minutes. Although reaction times and reaction temperatures can vary substantially, most preferred vinyl ester compositions containing a mesogenic or rigid rodlike moiety are produced by reacting to a specific conversion, typically 1.5 to 0.25 percent carboxylic acid.

Suitable ethylenically unsaturated monomers which can be employed herein can be selected from the many known classes of polymerizable vinyl monomers. Suitable such monomers include, for example, the vinyl aromatic compounds which include such monomers as styrene, alpha-methylstyrene, vinyl toluenes, halogenated styrenes, t-butylstyrenes, divinylbenzenes and the like. Other suitable monomers include the methyl, ethyl, isopropyl, octyl, etc. esters of acrylic or methacrylic acid; acidic monomers such as acrylic acid, methacrylic acid and crotonic acid; amide monomers such as acrylamide and N-alkylacrylamides; allyl monomers such as diallylphthalate, triallylisocyanurate, diallylmaleate and dimethallylfumarate; mixtures thereof and the like.

Preferred polymerizable monomers containing ethylenic unsaturation include, for example, styrene, p-vinyltoluene, o-, m- and p- halostyrenes, vinyl naphthalenes, vinyl acetate, the various alpha-substituted styrenes, as well as the various di-, tri- and tetrahalo styrenes and acrylic, methacrylic and crotonic acid esters including both the saturated alcohol esters and the hydroxyalkyl esters.

The ethylenically unsaturated monomers containing a mesogenic or rigid rodlike moiety which can be employed herein can be selected from the many known classes of polymerizable vinyl monomers containing one or more mesogenic or rigid rodlike groups. Representative types are cataloged by Alexandre Blumstein in *Liquid Crystalline Order in Polymers*, chapter 3, pages 105–140 (1978) published by Academic Press; V. Percec, J. M. Rodriguez-Parada and C. Ericsson, *Polymer Bulletin*, 17, pages 347–352 (1987); R. Duran and P. Gramain, *Makromol. Chem.*, 188, pages 2001–2009 (1987); N. A. Plate and V. P. Shibaev in *Comb-Shaped Polymers and Liquid Crystals* published by Plenum Press, New York (1987) on pages 1–415; A. M. Mousa, et al, *Polymer Bulletin*, 6, pages 485–492 (1982); H. Finkelmann, et al, *Makromol. Chem.*, 179, pages 829–832 (1978); M. Portugall, et al, *Makromol. Chem.*, 183, pages 2311–2321 (1982); U.S. Pat. Nos. 4,637,896 and 4,614,619; all of which are incorporated herein by reference.

Suitable polymerizable ethylenically unsaturated monomers containing one or more mesogenic or rigid rodlike moieties per molecule are represented by formulas XIII or XIV:

$$M\text{-}(Q^4)_n\text{-}R'\text{-}Q^3 \qquad (XIII)$$

$$M\text{-}Q^3 \qquad (XIV)$$

wherein M, R', R", $R^1$ and n are as hereinbefore defined; $Q^3$ is a polymerizable ethylenically unsaturated group; $Q^4$ is —O—, —$NR^1$—, —S—, —O—CO—, —CO—O—, —$NR^1$—CO—, —CO—$NR^1$—, —CO—, —O—CO—O—, —S—CO—, —CO—S—, —$NR^1$—CO—O—, —O—CO—$NR^1$— or —$NR^1$—CO—$NR^1$—. The rigid central linkage is required to bridge the aromatic rings to provide at least about 80 percent para substitution. The aromatic rings present in the M group may be inertly substituted, however, unsubstituted aromatic rings are most preferred. The aromatic rings may also contain one or more heteroatoms. Generally, the ethylenically unsaturated monomers containing —CH=$CH_2$, allyl, methallyl, propenyl, isopropenyl, acrylate or methacrylate as the polymerizable vinyl group and a linear divalent hydrocarbon group connecting the vinyl group and the mesogenic or rigid rodlike group through heteroatom containing functional groups between the hydrocarbon spacer and the mesogenic group and vinyl group are most preferred. Thus, a mesogenic group ether linked to a —$CH_2$—$CH_2$— which in turn is linked to provide a methacrylate ester, that is

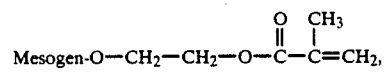
or a mesogenic group linked to a —CH$_2$—C$_6$H$_4$— which is in turn linked to a vinyl group, that is
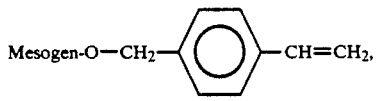
are most preferred as the ethylenically unsaturated monomer containing a mesogenic or rigid rodlike moiety.
Particularly suitable ethylenically unsaturated monomers containing a mesogenic or rigid rodlike moiety include, for example,
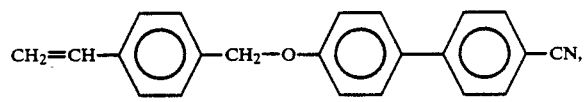
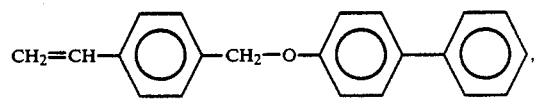
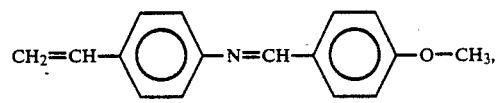
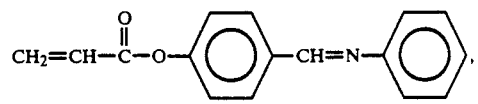
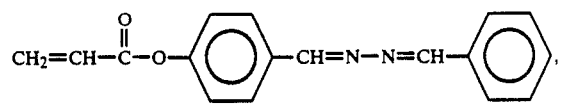
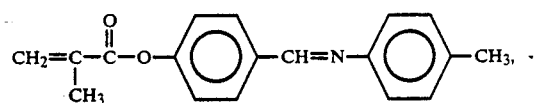
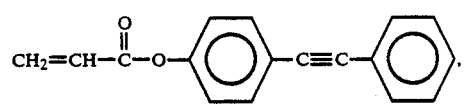
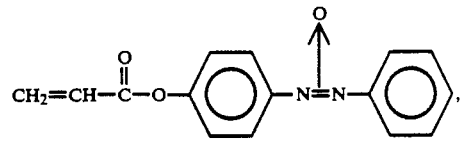
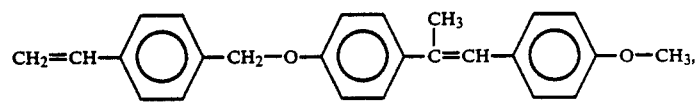
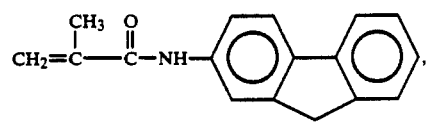

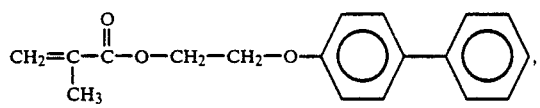
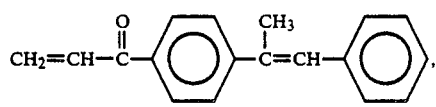
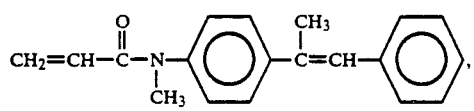
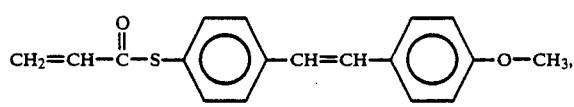
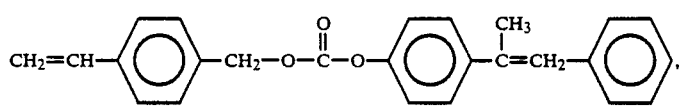
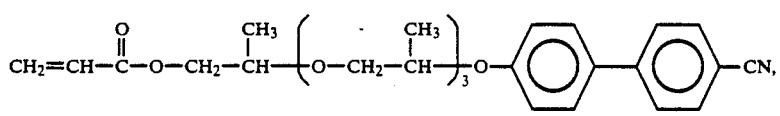
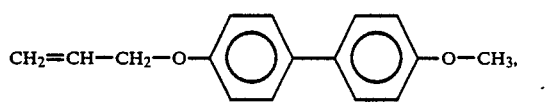
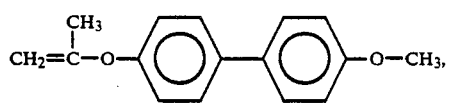
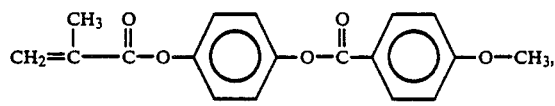
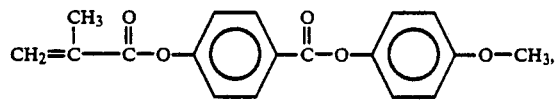
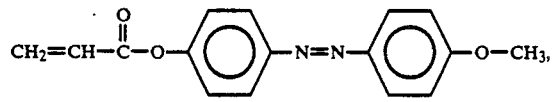
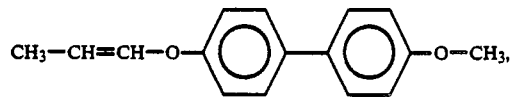
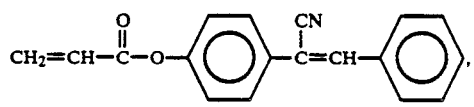

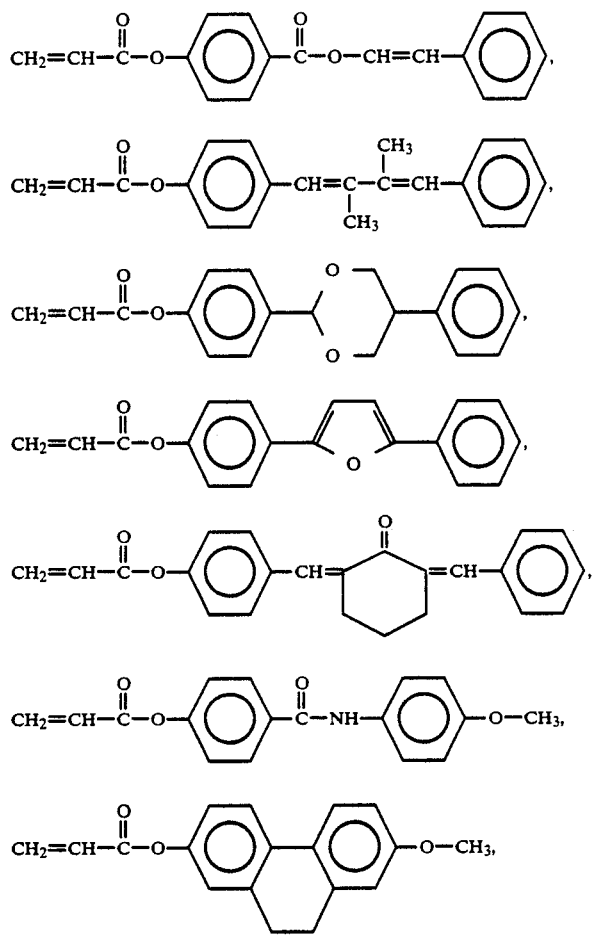

any combination thereof and the like.

Polymerizable mixtures of the vinyl ester compositions containing a mesogenic or rigid rodlike moiety can consist of from 1 to 99, preferably from about 20 to about 80, most preferably from about 30 to about 70, percent by weight of one or more polymerizable ethylenically unsaturated monomers with the balance of the combined weight consisting of said vinyl ester.

If an inert solvent is used to prepare the vinyl ester product, it is preferably removed, for example, by distillation under vacuum, prior to the addition of one or more ethylenically unsaturated monomers. For certain end uses, such as coating, impregnating a fibrous reinforcement or casting of a film, the presence of an inert solvent is desirable as a vehicle.

According to the present invention, the curing (thermosetting) of the vinyl ester compositions is effected by the application of heat and/or pressure in the presence of a free radical forming catalyst. Catalysts that can be used for the curing or polymerization are preferably the peroxide catalysts, such as benzoyl peroxide, lauroyl peroxide, t-butylhydroperoxide, methylethylketone peroxide, t-butylperbenzoate, potassium persulfate, mixtures thereof and the like. The amount of catalyst added will vary from 0.1 to about 2 percent by weight, preferably from 0.75 to 1.5 percent by weight. Temperatures employed can vary over a considerable range but usually are in the range of 20° C. to 250° C. Depending on the relative solubility and phase transition temperature(s) associated with the mesogenic or rigid rodlike moieties present in the vinyl ester compositions, curing at a elevated temperature can be especially desirable to enhance the molecular anisotropy of the cured product.

Additionally, more rapid curing of the vinyl ester compositions can be accomplished by the addition of accelerating agents such as lead or cobalt naphthenate, N,N,-dimethylaniline, mixtures thereof and the like, usually in concentrations ranging from about 0.01 to about 2 percent by weight, preferably 0.05 to 0.5 percent by weight.

The curing of the vinyl ester compositions can be performed in the presence of electric or magnetic fields or under conditions of shear flow for the purpose of orienting the mesogenic or rigid rodlike moieties contained therein. As specific examples of these processes, Finkelmann, et al, Macromol. Chem., 180, 803–806 (March 1979) induced orientation in thermotropic methacrylate copolymers containing mesogenic side chain groups decoupled from the main chain via flexible spacers in an electric field. Orientation of mesogenic side chain groups decoupled from the polymer main chain via flexible spacers in a magnetic field has been demonstrated by Roth and Kruecke, Macromol. Chem., 187, 2655–2662 (November 1986). Magnetic field induced orientation of mesogenic main chain containing polymers has been demonstrated by Moore, et al, ACS Polymeric Material Sciences and Engineering, 52, 84–86 (April–May 1985). Magnetic and electric field orientation of low molecular weight mesogenic compounds is discussed by W. R. Krigbaum in *Polymer Liquid Crystals*, pages 275-309 (1982) published by Academic Press, Inc. When the curing is to be performed in an electric or magnetic field, it is frequently of value to conduct simple preliminary experiments that allow for balancing of cure kinetics versus induction of orientation under the particular experimental conditions being employed (i.e. free radical forming catalyst level used, temperature used, inherent dielectric (diamagnetic) susceptibility of the specific mesogenic or rigid rodlike moiety used, etc.). This is done recognizing the relatively greater ease of inducing orientation in low molecular weight mesogenic compounds versus polymeric materials containing mesogenic moieties.

In a preferred process of the present invention, one or more polyepoxides and one or more monoepoxides containing a mesogenic or rigid rodlike moiety are simultaneously reacted with one or more monounsaturated monocarboxylic acids to provide a mixture containing both the vinyl ester of the polyepoxide and the monovinyl ester of the monoepoxide. In this manner, a thermosettable vinyl ester mixture containing a mesogenic or rigid rodlike functionality is produced wherein said mesogenic or rigid rodlike moiety is only present as side chain functionality pendant from the polymerizable monovinyl ester group derived from the monoepoxide. During the curing (thermosetting) reaction, the monovinyl ester containing a mesogenic or rigid rodlike moiety can serve to form linear polymer as well as to crosslink chains comprised of the di or polyvinyl ester of the di or polyepoxide. Association of the mesogenic or rigid rodlike side chain groups can thus induce orientation of the forming crosslinked matrix on a molecular level. It is this molecular orientation that leads to self-reinforcement of the thermoset vinyl ester matrix manifested in enhanced mechanical properties.

As a specific example of this preferred process of the present invention, a mixture of the diglycidyl ether of bisphenol A (Formula II wherein $R^1$=H, R=H, p=zero, n=1, $$A = -\underset{\underset{CH_3}{|}}{\overset{\overset{CH_3}{|}}{C}}-)$$

and the monoglycidyl ether of p-phenylphenol (produced via the reaction of the product of Formula VI wherein

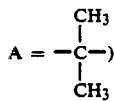

and Q=—OH, i.e., p-phenylphenol, and epichlorohydrin) are reacted with methacrylic acid to provide a mixture of the dimethacrylate of the diglycidyl ether of bisphenol A and the monomethacrylate of p-phenylphenol glycidyl ether:

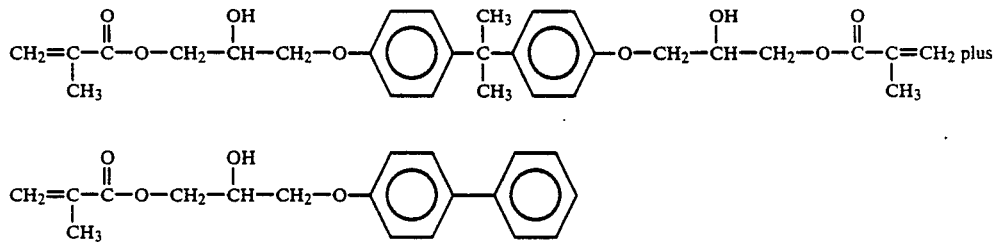

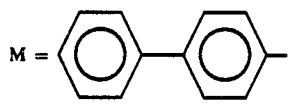

As an additional preferred embodiment of the present invention, the aforementioned vinyl ester mixture can be diluted with an ethylenically unsaturated monomer polymerizable therewith such as styrene.

In an additional preferred process of the present invention, one or more polyepoxides, one or more polyepoxides containing a mesogenic or rigid rodlike moiety and one or more monoepoxides containing a mesogenic or rigid rodlike moiety are simultaneously reacted with one or more monounsaturated monocarboxylic acids. In this manner, a thermosettable vinyl ester mixture containing mesogenic or rigid rodlike functionality is produced wherein said mesogenic or rigid rodlike moiety is present both as side chain functionality pendant from the polymerizable monovinyl ester group derived from the monoepoxide and as main chain functionality present in the backbone of the respective polyvinyl ester molecules derived from the polyepoxide reactant containing a mesogenic or rigid rodlike moiety. Association of the anisodiametric side chain groups and association of the anisodiametric main chain groups between the parallel polymer chains can induce orientation of the forming crosslinked matrix on a molecular level. The possibility for association between the anisodiametric side and main chain groups also exists and can induce additional orientation. It is this molecular orientation that leads to self-reinforcement of the thermoset vinyl ester matrix manifested in enhanced mechanical properties.

As a specific example of this preferred process of the present invention, a mixture of the diglycidyl ether of bisphenol A (Formula II wherein $R^1$=H, R=H, p=zero, n=1, $$A = -\underset{\underset{CH_3}{|}}{\overset{\overset{CH_3}{|}}{C}}-),$$

the diglycidyl ether of 4,4'-dihydroxybiphenyl (Formula II wherein $R^1$=H, R=H, p=zero, n=zero) and the monoglycidyl ether of p-phenylphenol (produced via the reaction of the product of Formula VI wherein

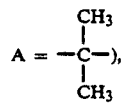

and Q=—OH, i.e., p-phenylphenol, and epichlorohydrin) are reacted with methacrylic acid to provide a mixture of the dimethacrylate of the diglycidyl ether of bisphenol A, the dimethacrylate of 4,4'-dihydroxybiphenyl and the monomethacrylate of p-phenylphenol glycidyl ether:

ment of the thermoset vinyl ester matrix manifested in enhanced mechanical properties.

As a specific example of this preferred process of the present invention, a mixture of the diglycidyl ether of bisphenol A advanced with the bis(phenolic) terminated terephthalyl diester of 3,3',5,5'-tetramethyl-4,4'-

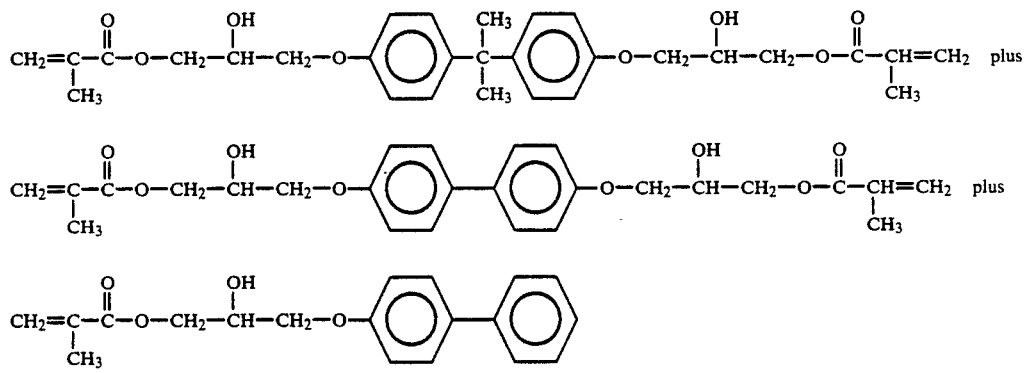

As an additional preferred embodiment of the present invention, the aforementioned vinyl ester mixture can be diluted with an ethylenically unsaturated monomer polymerizable therewith such as styrene.

In an additional preferred process of the present invention, one or more polyepoxides advanced with one or more polyphenols containing a mesogenic or rigid rodlike moiety and one or more monoepoxides containing a mesogenic or rigid rodlike moiety are simultaneously reacted with one or more monounsaturated monocarboxylic acids. In this manner, a thermosettable vinyl ester mixture containing mesogenic or rigid rodlike functionality is produced wherein said mesogenic or rigid rodlike moiety is present as both side chain functionality pendant from the polymerizable monovinyl ester group derived from the monoepoxide and as main chain functionality present in the backbone of the polyvinyl ester molecules derived from the advanced polyepoxide reactant containing a mesogenic or rigid rodlike moiety. Association of the anisodiametric side chain groups and association of the anisodiametric main chain groups between the parallel polymer chains can induce orientation of the forming crosslinked matrix on a molecular level. The possibility for association between the anisodiametric side and main chain groups also exists and can induce additional orientation. It is this molecular orientation that leads to self-reinforcedihydroxybiphenyl and the monoglycidyl ether of p-phenylphenol are reacted with methacrylic acid to provide a mixture of the dimethacrylate of the advanced epoxy resin and the monomethacrylate of p-phenylphenol glycidyl ether:

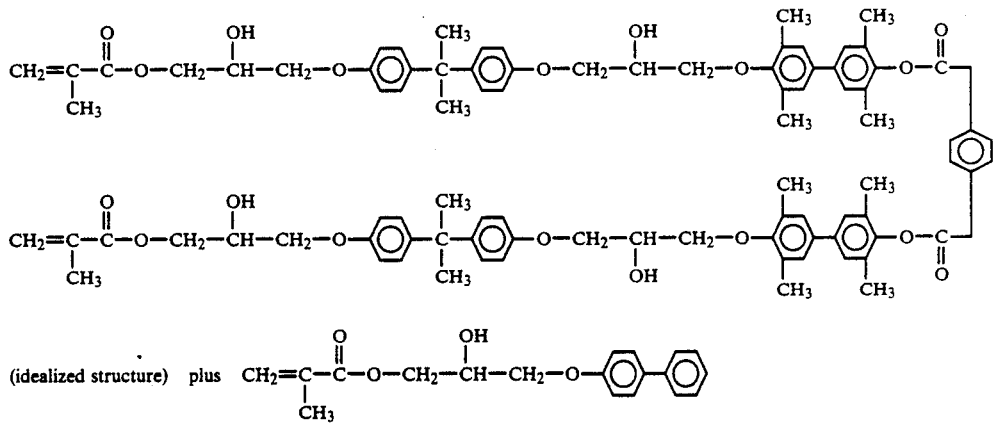

As an additional preferred embodiment of the present invention, the aforementioned vinyl ester mixture can be diluted with an ethylenically unsaturated monomer polymerizable therewith such as styrene.

Many other processes of the present invention will be recognized by the skilled artisan: Thus, one or more polyepoxides containing a mesogenic or rigid rodlike moiety and, optionally, one or more monoepoxides containing a mesogenic or rigid rodlike moiety can be reacted with one or more monounsaturated monocarboxylic acids. Further, one or more polyepoxides containing a mesogenic or rigid rodlike moiety advanced with one or more polyphenols containing a mesogenic or rigid rodlike moiety and, optionally, one or more monoepoxides containing a mesogenic or rigid rodlike moiety can be reacted with one or more monounsaturated monocarboxylic acids. Further, one or more polyepoxides advanced with one or more polyphenols containing a mesogenic or rigid rodlike moiety can be blended with one or more polyepoxides and one or more monoepoxides containing a mesogenic or rigid rodlike moiety prior to reaction with one or more monounsaturated monocarboxylic acids to produce a vinyl ester mixtures with a bimodal molecular weight distribution of the polyvinyl ester species. Further, one or more polyepoxides containing a mesogenic or rigid rodlike functionality, one or more polyepoxides advanced with one or more polyphenols containing a mesogenic or rigid rodlike moiety and, optionally, one or more monoepoxides containing a mesogenic or rigid rodlike moiety can be simultaneously reacted with one or more monounsaturated monocarboxylic acids.

The vinyl esters containing a mesogenic or rigid rodlike groups and polymerizable mixtures thereof are useful to provide castings, coatings, encapsulations, films and the like which are inherently self-reinforced. Composites can also be prepared using the vinyl esters of the present invention by the addition of fillers and/or reinforcing materials. As an example, laminates are made by mixing into the vinyl ester or polymerizable mixture containing the vinyl ester a known amount of one or more catalysts and/or accelerators and adding this mixture to a suitable fibrous reinforcement such as asbestos fibers, carbon fibers, fibrous glass or inorganic fibers. The vinyl ester or polymerizable mixture thereof can be rolled, sprayed or impregenated into the fibrous reinforcement, such as fibrous glass. When fibrous glass is used, it can be in any form such as chopped strands, filaments, glass ribbons, glass yarns or reinforcing mats.

The vinyl ester or polymerizable mixture thereof can be compounded with solvents, pigments, low profile additives, fillers, flow modifiers, gel retardation agents, thixotropic additives, other resinous products and cured to form useful coatings in a manner well known in the art.

The following examples are provided to illustrate the practice of the invention but are not to be construed as to limiting the scope thereof in any manner.

EXAMPLE 1

Synthesis of a Vinyl Ester of a Diglycidyl Ether of Bisphenol A Containing in situ Formed Rigid Rodlike Side Chain Vinyl Ester Monomer (12.65% wt.)

A diglycidyl ether of bisphenol A (400.0 grams, 2.199 epoxide equivalents) having an epoxide equivalent weight of 181.895, p-phenylphenol glycidyl ether (100.0 grams, 0.4105 epoxide equivalent) having an epoxide equivalent weight of 243.63, methacrylic acid (217.69 grams, 2.53 moles) and hydroquinone (0.287 gram, 400 ppm based on epoxide functional reactants and methacrylic acid) are added to a reactor and heated to 90° C. with stirring and sparging with air (0.5 liter per minute). Twenty three minutes later, the 90° C. reaction temperature is achieved and 33.33% aqueous chromium trichloride catalyst (0.625 gram, 0.125% wt. based on epoxide functional reactants) is added to the reactor and the temperature controller set at 110° C. and this temperature is achieved nineteen minutes later. After four minutes the temperature controller is set at 115° C. and this temperature is achieved six minutes later. After 181 minutes at the 115° C. reaction temperature, titration of samples of the vinyl ester mixture shows the presence of 0.625 percent epoxide and 0.45 percent acid. Fifteen minutes later, cooling of the reactor to 80° C. begins and this temperature is achieved thirteen minutes later. Phenothiazine (0.143 gram, 200 ppm based on vinyl ester mixture) is added to the reactor with stirring into the 80° C. vinyl ester mixture over the next five minutes. Styrene inhibited with 50 ppm of t-butylcatechol (341.66 grams, 32.35% wt. of the vinyl ester mixture after correction for sample weight removed for titration) is added to the reactor with continuation of stirring until a homogeneous solution formed. The product is filtered through a coarse fritted glass funnel and recovered as a light green colored styrenated vinyl ester resin containing 55% wt. dimethacrylate of bisphenol A diglycidyl ether, 12.65% wt. methacrylate of p-phenylphenol glycidyl ether and 32.35% wt. styrene.

EXAMPLE 2

Synthesis of a Vinyl Ester of a Diglycidyl Ether of Bisphenol A Containing in situ Formed Rigid Rodlike Side Chain Vinyl Ester Monomer (21.69% wt.)

A diglycidyl ether of bisphenol A (350.0 grams, 1.924 epoxide equivalents) having an epoxide equivalent weight of 181.895, p-phenylphenol glycidyl ether (150.0 grams, 0.6157 epoxide equivalent) having an epoxide equivalent weight of 243.63, methacrylic acid (211.88 grams, 2.46 moles) and hydroquinone (0.285 gram, 400 ppm based on epoxide functional reactants and methacrylic acid) are added to a reactor and heated to 90° C. with stirring and sparging with air (0.5 liter per minute). Twenty two minutes later, the 90° C. reaction temperature is achieved and 33.33% aqueous chromium trichloride catalyst (0.625 gram, 0.125% wt. based on epoxide functional reactants) is added to the reactor and the temperature controller set at 110° C. and this temperature is achieved sixteen minutes later. After two minutes the temperature controller is set at 115° C. and this temperature is achieved eight minutes later. After 226 minutes at the 115° C. reaction temperature, titration of samples of the vinyl ester mixture shows the presence of 0.38 percent epoxide and 0.48 percent acid. Ten minutes later, cooling of the reactor to 80° C. begins and this temperature is achieved thirteen minutes later. Phenothiazine (0.142 gram, 200 ppm based on vinyl ester mixture) is added to the reactor with stirring into the 80° C. vinyl ester mixture over the next five minutes. Styrene inhibited with 50 ppm of t-butylcatechol (215.38 grams, 23.31% wt. of the vinyl ester mixture after correction for sample weight removed for titration) is added to the reactor with continuation of stirring until a homogeneous solution formed. The product is filtered through a coarse fritted glass funnel and recovered as a light green colored styrenated vinyl ester resin containing 55% wt. dimethacrylate of bisphenol A diglycidy ether, 21.69% wt. methacrylate of p-phenylphenol glycidyl ether and 23.31% wt. styrene.

EXAMPLE 3

Synthesis of a Vinyl Ester of a Diglycidyl Ether of Bisphenol A and a Rigid Rodlike Diglycidyl Ether Containing in situ Formed Rigid Rodlike Side Chain Vinyl Ester Monomer (12.60% wt.)

A diglycidyl ether of bisphenol A (350.0 grams, 1.924 epoxide equivalents) having an epoxide equivalent weight of 181.895, a diglycidyl ether of 4,4'-dihydroxybiphenyl (50.0 grams, 0.3038 epoxide equivalent) having an epoxide equivalent weight of 164.61, p-phenylphenol glycidyl ether (100.0 grams, 0.4105 epoxide equivalent) having an epoxide equivalent weight of 243.63, methacrylic acid (220.10 grams, 2.56 moles) and hydroquinone (0.288 gram, 400 ppm based on epoxide functional reactants and methacrylic acid) are added to a reactor and heated to 90° C. with stirring and sparging with air (0.5 liter per minute). Fifteen minutes later, the 90° C. reaction temperature is achieved and 33.33% aqueous chromium trichloride catalyst (0.625 gram, 0.125% wt. based on epoxide functional reactants) is added to the reactor and the temperature controller set at 110° C. and this temperature is achieved fourteen minutes later. After four minutes the temperature controller is set at 115° C. and this temperature is achieved five minutes later. After 223 minutes at the 115° C. reaction temperature, titration of samples of the vinyl ester mixture shows the presence of 0.64 percent epoxide and 0.51 percent acid. Fifteen minutes later, cooling of the reactor to 80° C. begins and this temperature is achieved nineteen minutes later. Phenothiazine (0.143 gram, 200 ppm based on vinyl ester mixture) is added to the reactor with stirring into the 80° C. vinyl ester mixture over the next five minutes. Styrene inhibited with 50 ppm of t-butylcatechol (342.18 grams, 32.40% wt. of the vinyl ester mixture after correction for sample weight removed for titration) is added to the reactor with continuation of stirring until a homogeneous solution formed. The product is filtered through a coarse fritted glass funnel and recovered as a light green colored styrenated vinyl ester resin containing 47.93% wt. dimethacrylate of bisphenol A diglycidyl ether, 7.07% wt. dimethacrylate of 4,4'-dihydroxybiphenyl diglycidyl ether, 12.60% wt. methacrylate of p-phenylphenol glycidyl ether and 32.40% wt. styrene.

COMPARATIVE EXPERIMENT A

Preparation of a Vinyl Ester Resin of a Diglycidyl Ether of Bisphenol A Containing 45.0% wt. Styrene A portion (400.0 grams) of the vinyl ester resin from Comparative Experiment A is diluted with additional styrene (109.0 grams) to give a vinyl ester resin containing 55.0% wt. dimethacrylate of bisphenol A diglycidyl ether (280.0 grams) and 45.0% wt. styrene (229.0 grams).

COMPARATIVE EXPERIMENT B

Synthesis of a Vinyl Ester Resin of a Diglycidyl Ether of Bisphenol A Containing 30.0% wt. Styrene A diglycidyl ether of bisphenol A (500.0 grams, 2.749 epoxide equivalents) having an epoxide equivalent weight of 181.895, methacrylic acid (229.31 grams, 2.67 moles) and hydroquinone (0.292 gram, 400 ppm based on epoxide functional reactant and methacrylic acid) are added to a reactor and heated to 90° C. with stirring and sparging with air (0.5 liter per minute). Twenty six minutes later, the 90° C. reaction temperature is achieved and 33.33% aqueous chromium trichloride catalyst (0.625 gram, 0.125% wt. based on epoxide functional reactant) is added to the reactor and the temperature controller set at 110° C. and this temperature is achieved eleven minutes later. After five minutes the temperature controller is set at 115° C. and this temperature is achieved five minutes later. After 330 minutes at the 115° C. reaction temperature, titration of samples of the vinyl ester demonstrated the presence of 0.21 percent epoxide and 0.36 percent acid. Ten minutes later, cooling of the reactor to 80° C. begins and this temperature is achieved eleven minutes later. Phenothiazine (0.145 gram, 200 ppm based on vinyl ester) is added to the reactor with stirring into the 80° C. vinyl ester over the next five minutes. Styrene inhibited with 50 ppm of t-butylcatechol (310.23 grams, 30.0% wt. of the vinyl ester after correction for sample weight removed for titration) is added to the reactor with continuation of stirring until a homogeneous solution formed. The product is filtered through a coarse fritted glass funnel and recovered as a light green colored styrenated vinyl ester resin containing 70.0% wt. dimethacrylate of bisphenol A diglycidyl ether and 30.0% wt. styrene.

EXAMPLE 4

Physical and Mechanical Property Testing

Brookfield viscosities of the vinyl ester resins are determined once the resin has equilibrated to 25° C.±0.2° C. in a constant temperature bath. Portions (250.0 grams) of the vinyl ester resins of Examples 1, 2, and 3 and Comparative Experiments A and B are accelerated by mixing with 0.10% wt. cobalt naphthenate (6 percent) (0.25 gram) then catalyzed by mixing with 1.0% methylethylketone peroxide (2.50 grams). The resultant vinyl ester resins are degassed by centrifugation until visually clear solutions are obtained. The vinyl ester resins of Example 1 and Comparative Experiments A and B are accelerated, catalyzed and cured at 25° C.; the vinyl ester resin of Example 2 is accelerated, catalyzed and cured at 55° C. and the vinyl ester resin of Example 3 is accelerated, catalyzed and cured at 75° C. The aforesaid curing is accomplished by pouring each liquid vinyl ester resin into a ⅛ inch casting mold maintained at the aforementioned respective temperature. After curing for one hour, the castings are removed and post cured at 100° C. for two hours then 125° C. for two hours. Mechanical properties of tensile (8) and flexural (6) test pieces prepared from each casting are determined using an Instron machine with standard test methods (ASTM D 638-77a and D 790-71). Heat distortion temperature of a pair of test pieces is determined using an Aminco Plastic Deflection Tester (American Instrument Co.) with standard test methods (ASTM D 648-72). The average Barcol hardness value (10 measurements) is on the 934-1 scale. The results are reported in Table I.

TABLE I

| MECHANICAL PROPERTY | EXAMPLE 1<br>DGEBPADMA$^a$<br>(55% wt.)<br>p-PPGEMA$^c$<br>(12.65% wt.)<br>STYRENE<br>(32.35% wt.) | EXAMPLE 2<br>DGEBPADMA$^a$<br>(55% wt.)<br>p-PPGEMA$^c$<br>(21.69% wt.)<br>STYRENE<br>(23.31% wt.) | EXAMPLE 3<br>DGEBPADMA$^a$<br>(47.93% wt.)<br>DGEDHBDMA$^b$<br>(7.07% wt.)<br>p-PPGEMA$^c$<br>(12.60% wt.)<br>STYRENE<br>(32.40% wt.) | COMP. EXPT. A<br>DGEBPADMA$^a$<br>(55% wt.)<br>STYRENE (45% wt.) | COMP. EXPT. B<br>DGEBPADMA$^a$<br>(70% wt.)<br>STYRENE (30% wt.) |
|---|---|---|---|---|---|
| BROOKFIELD VISCOSITY (cp @ 25° C.) | 87 | 259 | ND$^d$ | 32.5 | 209 |
| BARCOL HARDNESS | 51 | 51 | 49 | 48 | 49 |
| TENSILE STRENGTH (PSI) | 13,465 | 13,141 | 12,642 | 11,775 | 10,762 |
| ELONGATION (%) | 3.55 | 2.59 | 3.10 | 3.45 | 2.58 |

TABLE I-continued

| MECHANICAL PROPERTY | EXAMPLE 1 DGEBPADMA$^a$ (55% wt.) p-PPGEMA$^c$ (12.65% wt.) STYRENE (32.35% wt.) | EXAMPLE 2 DGEBPADMA$^a$ (55% wt.) p-PPGEMA$^c$ (21.69% wt.) STYRENE (23.31% wt.) | EXAMPLE 3 DGEBPADMA$^a$ (47.93% wt.) DGEDHBDMA$^b$ (7.07% wt.) p-PPGEMA$^c$ (12.60% wt.) STYRENE (32.40% wt.) | COMP. EXPT. A DGEBPADMA$^a$ (55% wt.) STYRENE (45% wt.) | COMP. EXPT. B DGEBPADMA$^a$ (70% wt.) STYRENE (30% wt.) |
|---|---|---|---|---|---|
| TENSILE MODULUS (psi × 10$^5$) | 5.47 | 6.38 | 5.64 | 5.16 | 5.41 |
| FLEXURAL STRENGTH (PSI) | 25,749 | 22,969 | 24,722 | 18,959 | 19,711 |
| FLEXURAL MODULUS (PSI × 10$^5$) | 6.01 | 6.71 | 6.11 | 5.30 | 5.72 |
| HEAT DISTORTION TEMPERATURE (°F.) | 234 | 223.3 | 246 | 261.5 | 261.5 |

$^a$DGEBPADMA = Dimethacrylate of bisphenol A diglycidyl ether
$^b$DGEDHBDMA = Dimethacrylate of 4,4'-dihydroxybiphenyl diglycidyl ether
$^c$p-PPGEMA = p-Phenylphenol glycidyl ether methacrylate
$^d$ND = Not determined (precipitation occurs at 25° C.)

EXAMPLE 5

Synthesis of a Vinyl Ester of a Diglycidyl Ether of Bisphenol A Advanced with bis(Phenolic) Terminated Terephthalyl Diesters of 3,3',5,5'-Tetramethyl-4,4'-dihydroxybiphenyl Containing in situ Formed Rigid Rodlike Side Chain Vinyl Ester Monomer

A. Advancement Reaction

A diglycidyl ether of bisphenol A (340.0 grams, 1.869 epoxide equivalents) having an epoxide equivalent weight of 181.895 and a bis(phenolic) terminated diester mixture of 3,3',5,5'-tetramethyl-4,4'-dihydroxybiphenyl (60.0 grams) are added to a reactor and heated to 90° C. with stirring under a nitrogen atmosphere. Ethyltriphenylphosphonium acetate.acetic acid complex (0.40 gram, 0.10% wt. of total reactants) is added to the reactor and the temperature controller is set at 175° C. and this temperature is achieved forty one minutes later. After one hour at the 175° C. reaction temperature, the temperature controller is set at 190° C. and this temperature is achieved twelve minutes later. After one hour at the 190° C. reaction temperature, the advanced epoxy resin is cooled to 90° C. and recovered as an amber colored liquid containing 16.32 percent epoxide.

The bis(phenolic) terminated diester mixture employed above is prepared by adding triethylamine (0.40 mole, 40.48 grams) over a eight minute period to a mixture of 3,3',5,5'-tetramethyl-4,4'-dihydroxybiphenyl (0.50 mole, 121.15 grams), terephthalyl chloride (0.167 mole, 33.84 grams), toluene (400 grams) and methylisobutylketone (400 grams) maintained under a nitrogen atmosphere at 80° C. with stirring. Following 23 hours of post reaction, the reaction product is dried by rotary evaporation and the remaining powder washed with deionized water until free of triethylamine hydrochloride. After drying under vacuum at 80° C., a light yellow colored product is recovered (141.29 grams). Gel permeation chromatographic analysis revealed the product to contain 49 area percent unreacted 3,3',5,5'-tetramethyl-4,4'-dihydroxybiphenyl, 31 area percent bis(phenolic) terminated terephthalyl diester of 3,3',5,5'-tetramethyl-4,4'-dihydroxybiphenyl with the balance as higher molecular weight bis(phenolic) terminated ester.

B. Preparation of Vinyl Ester

A portion (397.47 grams, 1.509 epoxide equivalents) of the advanced epoxy resin from A. above, p-phenylphenol glycidyl ether (99.37 grams, 0.4079 epoxide equivalent) having an epoxide equivalent weight of 243.63, methacrylic acid (159.89 grams, 1.86 moles) and hydroquinone (0.263 gram, 400 ppm based on epoxide functional reactants and methacrylic acid) are added to a reactor and heated to 90° C. with stirring and sparging with air (0.5 liter per minute). Ten minutes later, the 90° C. reaction temperature is achieved and 33.33% aqueous chromium trichloride catalyst (0.621 gram, 0.125% wt. based on epoxide functional reactants) is added to the reactor and the temperature controller set at 110° C. and this temperature is achieved nine minutes later. After four minutes the temperature controller is set at 115° C. and this temperature is achieved one minute later. After 256 minutes at the 115° C. reaction temperature, titration of samples of the vinyl ester mixture demonstrated the presence of 0.53 percent epoxide and 0.27 percent acid. Fifteen minutes later, cooling of the reactor to 80° C. begins and this temperature is achieved fifteen minutes later. Phenothiazine (0.131 gram, 200 ppm based on vinyl ester mixture) is added to the reactor with stirring into the 80° C. vinyl ester mixture over the next five minutes. Styrene inhibited with 50 ppm of t-butylcatechol (292.99 grams, 30.98% wt. of the vinyl ester mixture after correction for sample weight removed for titration) is added to the reactor with continuation of stirring until a homogeneous solution formed. The product is filtered through a coarse fritted glass funnel and recovered as a light amber colored styrenated vinyl ester resin containing 55.00% wt. dimethacrylate of advanced bisphenol A diglycidyl ether, 14.02% wt. methacrylate of p-phenylphenol glycidyl ether and 30.98% wt. styrene.

EXAMPLE 6

Curing of a Vinyl Ester of a Diglycidyl Ether of Bisphenol A Containing in situ Formed Rigid Rodlike Side Chain Vinyl Ester Monomer in an Electric Field A portion (250.0 grams) of a vinyl ester of a diglycidyl ether of bisphenol A containing 12.65% wt. of rigid rodlike side chain vinyl ester monomer and 32.35% wt. styrene prepared using the method of Example 1 is accelerated by mixing with 0.05% wt. cobalt naphthenate (6 percent) (0.125 gram) then catalyzed by mixing with 1.0% methylethylketone peroxide (2.50 grams). The resultant vinyl ester resin is degassed by centrifugation until a visually clear solution is obtained. Curing is accomplished by pouring the vinyl ester resin into a ⅛ inch metal mold made from a pair of aluminum plates insulated from each other using a rubber gasket. The mold is then placed into an oven maintained at 50° C. and the leads from a DC power source are hooked to each respective metal plate. A 16 volt (0 amperage) electric field is applied to the casting plates for two hours, after which time, the mold is deenergized and the casting recovered and post cured at 100° C. for two hours then at 125° C. for two hours.

A second casting is prepared using the aforementioned resin, accelerator and catalyst combination and method of preparation. The filled mold is placed into an oven maintained at 35° C. followed by application of a 600 volt electric field. After two hours, the resin gels. After an additional hour, the oven temperature is increased to 50° C. One hour later, the mold is deenergized and the casting recovered and post cured at 100° C. for two hours then 125° C. for two hours. Mechanical properties of both castings are evaluated using the method of Example 4. All test pieces for the mechanical property evaluations are cut parallel to the top of the casting. The results are reported in Table II.

TABLE II

|  | Resin cured in 16 volt field | Resin cured in 600 volt field |
|---|---|---|
| Tensile Strength, |  |  |
| psi | 11,966 | 10,545 |
| kPa | 82,503 | 72,706 |
| Elongation (%) | 2.38 | 2.01 |
| Tensile Modulus, (psi × 10⁵) | 6.12 | 6.08 |
| Flexural Strength, |  |  |
| psi | 22,375 | 14,773 |
| kPa | 154,271 | 101,857 |
| Flexural Modulus, |  |  |
| psi | 642,000 | 672,000 |
| kPa | 4,426,462 | 4,633,306 |
| Heat Distortion Temperature (°C.) | 231 | 231 |

EXAMPLE 7

A. Synthesis of 4,4'-Dihydroxy-α-Methylstilbene

Phenol (188.22 grams, 2.0 moles) and chloroacetone (102.81 grams, 1.0 mole as chloroacetone) are added to a reactor and cooled to −10° C. with stirring. The chloroacetone used is a technical grade containing 90% chloroacetone, 2.5% acetone, 6.5% 1,1-dichloroacetone and 1.0% 1,3-dichloroacetone. Concentrated sulfuric acid (98.08 grams, 1.0 mole) is added dropwise to the stirred solution over a one hour period and so as to maintain the reaction temperature between −10° and −11° C. After two hours of post reaction at the −10° C. temperature, the viscous orange oil product is mixed with 500 milliliters of iced deionized water. The oil product is separated then washed with a second 500 milliliter portion of chilled deionized water. After separation, the recovered oil product is added to a 2-liter beaker along with 250 milliliters of ethanol and stirred to provide a solution. Deionized water (250 milliliters) is added to the stirred solution and heating commenced. As the temperature of the mixture increased, the stirred mixture began to clear. Each time clearing is observed, sufficient deionized water is added to induce cloudiness, followed by continuation of the mixing and heating. Once the temperature reaches 90° C., a massive precipitation of white crystalline plates occurs. At this time, heating and stirring ceases and the mixture is chilled to 5° C. and held therein for 12 hours. The crystalline product is recovered by filtration, washed with two 150 milliliter portions of deionized water, then dried at 90° C. and 5 mm Hg to a constant weight of 103 grams. Nuclear magnetic resonance spectroscopy and infrared spectrophotometric analysis confirmed the product structure.

B. Epoxidation of 4,4'-Dihydroxy-α-Methylstilbene 4,4'-dihydroxy-α-methylstilbene (113.13 grams, 1.0 hydroxyl equivalent) prepared using the method of A above, epichlorohydrin (462.65 grams, 5 moles), deionized water (40.23 grams, 8.0 percent by weight of the epichlorohydrin used) and isopropanol (249.12 grams, 35 percent by weight of the epichlorohydrin used) are added to a reactor and heated to 55° C. with stirring under a nitrogen atmosphere. Once the 55° C. reaction temperature is achieved, sodium hydroxide (36.0 grams, 0.90 mole) dissolved in deionized water (144 grams) is added dropwise to the reactor over a 40-minute period and so as to maintain reaction temperature between 55° and 59° C. Ten minutes after completion of the aqueous sodium hydroxide addition, the stirring is stopped and the aqueous layer which separates from the reaction mixture is pipetted off and discarded. Stirring is resumed and after a total of twenty minutes following completion of the initial aqueous sodium hydroxide addition, a second solution of sodium hydroxide (16.0 grams, 0.40 mole) dissolved in deionized water (64 grams) is added to the reactor over a twenty minute period and so as to maintain the 55° C. reaction temperature. Fifteen minutes after completion of the aqueous sodium hydroxide addition, the recovered reaction mixture is added to a separatory funnel and washed with 750 milliliters of deionized water. The separated organic layer is washed a second time (750 milliliters deionized water), recovered and then rotary evaporated under vacuum for 45 minutes at 110° C. then 30 minutes at 130° C. The product is recovered (166.5 grams) as a crystalline off-white solid with an epoxide equivalent weight of 181.46.

C. Characterization of Liquid Crystallinity in the Diglycidyl Ether of 4,4'-Dihydroxy-α-Methylstilbene A portion (10.84 milligrams) of the diglycidyl ether of 4,4'-dihydroxy-α-methylstilbene from B above is analyzed by differential scanning calorimetry using a heating rate of 10° C. per minute and a temperature range of 30° to 150° C. The following results are obtained:

| Cycle Designation | Observed Transition Temperatures (°C.) midpoint/range | Enthalpy (J/G) | Comments |
|---|---|---|---|
| First heat (30 to 150° C.) | 73/55–84 | 6.3 | — |
|  | 122/84–130 | 41.8 | — |
| First cooling (150 to 30° C.) | —/81–52 | — | 2 unresolved broad, flat peaks |
| Second heat (30 to 150° C.) | 81/48–92 (shoulder at 69) | 31.4 | — |
|  | 124/108–132 | 3.6 | — |
| Second cooling | —/81–52 | — | 2 unresolved broad, flat |

| Cycle Designation | Observed Transition Temperatures (°C.) midpoint/range | Enthalpy (J/G) | Comments |
|---|---|---|---|
| (150 to 30° C.) | | | peaks |

Analysis of the diglycidyl ether via polarized light microscopy is completed using a microscope equipped with a programmable hot stage using a heating rate of 20° C. per minute. The following results are obtained:

| Cycle Designation | Observed Transition Temperatures (°C.) | Comments |
|---|---|---|
| First heat | 109 | First fluidity noted. |
| | 137 | Isotropization completed. |
| First cooling | 91 | First mobile nematic droplets observed. |
| | 51 | First crystallization noted. |
| Second heat | 63 | First fluidity noted. |
| | 78 | Flows to nematic texture. |
| | 86 | Isotropization completed but minor crystalline fraction still present. |
| | 133 | All crystalline fraction melted. |
| Second cooling | 91 | First mobile nematic droplets observed. |
| | 51 | First crystallization noted. |

The diglycidyl ether is a monotropic liquid crystal with a nematic texture. Two fractions are present; the minor higher melting crystalline fraction becomes liquid crystalline at 91° C. (microscopic observation) followed by the development of liquid crystallinity in the second, lower melting fraction. This accounts for the broadness and overlapping observed in the cooling cycles by differential scanning calorimetry.

D. Synthesis of the Vinyl Ester of 4,4'-Dihydroxy-α-methylstilbene Diglycidyl Ether A portion of the diglycidyl ether of 4,4'-dihydroxy-α-methylstilbene (145.0 grams, 0.799 epoxide equivalent) from B above, methacrylic acid (66.66 grams, 0.775 moles) and hydroquinone (0.085 gram, 400 ppm based on epoxy resin and methacrylic acid) are added to a reactor and heated to 90° C. with stirring and sparging with air (0.5 liter per minute). Once the 90° C. reaction temperature is achieved, 33.33% aqueous chromium trichloride catalyst (0.181 gram, 0.125% wt. based on epoxy resin) is added to the reactor and the temperature controller set at 110° C. and this temperature is achieved nine minutes later. After five minutes the temperature controller is set at 115° C. and this temperature is achieved four minutes later. After 295 minutes at the 115° C. reaction temperature, titration of samples of the vinyl ester demonstrated the presence of 0.53 percent epoxide and 0.66 percent acid. Ten minutes later, cooling of the reactor to 80° C. commenced and this temperature is achieved eleven minutes later. Phenothiazine (0.042 gram, 200 ppm based on vinyl ester) is added to the reactor with stirring into the 80° C. vinyl ester over the next five minutes. Styrene inhibited with 50 ppm of t-butylcatechol (169.82 grams, 45.0% wt. of the vinyl ester after correction for sample weight removed for titration) is added to the reactor with continuation of stirring until a homogeneous solution forms. The product is filtered through a coarse fritted glass funnel and recovered as a light amber colored styrenated vinyl ester resin containing 55.0% wt. dimethacrylate of the diglycidyl ether of 4,4'-dihydroxy-α-methylstilbene and 45.0% wt. styrene. A portion (250.0 grams) of the vinyl ester resin is cured and used for physical and mechanical property testing as per the method of Example 4. The results are given in Table III.

TABLE III

| Mechanical Property | |
|---|---|
| Brookfield Viscosity (cp @ 25° C.) | 70 |
| Barcol Hardness | 48 |
| Tensile Strength (psi) | 12,500 |
| Elongation (%) | 5.0 |
| Tensile Modulus (psi) | 525,801 |
| Flexural Strength (psi) | 20,462 |
| Flexural Modulus (psi) | 519,000 |
| Heat Distortion Temperature (°F.) | 294 |

What is claimed is:
1. A thermosettable mixture comprising
   (A) a thermosettable vinyl ester prepared by reacting
      (1) one or more polyepoxide compounds; with
      (2) one or more polymerizable monounsaturated monocarboxylic acids; and blending said reaction product with
   (B) one or more polymerizable ethylenically unsaturated monomers, at least one of which contains a mesogenic or rigid rodlike moiety.
2. A thermosettable mixture of claim 1 wherein from about 1 to about 100 percent of the polyepoxide compound(s) contain a mesogenic or rigid rodlike moiety.
3. A thermosettable mixture of claim 1 wherein said mesogenic or rigid rodlike moieties are oriented.
4. A thermosettable mixture of claim 3 wherein said orientation is by means of an electric field, a magnetic field or shear flow or any combination thereof.
5. The product resulting from thermosetting (curing) the thermosettable composition of claim 1 or 2.
6. The product of claim 5 resulting from application of an electric field or magnetic field or shear flow or any combination thereof during thermosetting (curing).
7. The product of claim 5 which additionally contains one or more fillers and/or reinforcing materials.
8. The product of claim 6 which additionally contains one or more fillers and/or reinforcing materials.

* * * * *